(12) United States Patent
Thangarasa et al.

(10) Patent No.: US 12,413,994 B2
(45) Date of Patent: Sep. 9, 2025

(54) METHOD AND APPARATUS FOR CONTROLLING TRANSMISSION ON PRECONFIGURED UPLINK RESOURCES IN A WIRELESS COMMUNICATION NETWORK

(71) Applicant: Telefonaktiebolaget LM Ericsson (publ), Stockholm (SE)

(72) Inventors: Santhan Thangarasa, Vällingby (SE); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 859 days.

(21) Appl. No.: 17/608,680

(22) PCT Filed: May 1, 2020

(86) PCT No.: PCT/EP2020/062217
§ 371 (c)(1),
(2) Date: Nov. 3, 2021

(87) PCT Pub. No.: WO2020/225161
PCT Pub. Date: Nov. 12, 2020

(65) Prior Publication Data
US 2022/0217565 A1   Jul. 7, 2022

Related U.S. Application Data

(60) Provisional application No. 62/842,835, filed on May 3, 2019.

(51) Int. Cl.
*H04W 24/10* (2009.01)
*H04B 17/318* (2015.01)
(Continued)

(52) U.S. Cl.
CPC .......... *H04W 24/10* (2013.01); *H04B 17/318* (2015.01); *H04W 56/0045* (2013.01); *H04W 76/28* (2018.02)

(58) Field of Classification Search
CPC ......... H04W 56/0045; H04W 56/0015; H04W 24/08; H04W 24/10; H04W 52/0225;
(Continued)

(56) References Cited

U.S. PATENT DOCUMENTS 12,004,204 B2 *  6/2024  Shin .................. H04W 56/0055
2005/0135327 A1   6/2005  Cooper
(Continued)

FOREIGN PATENT DOCUMENTS

| CN | 104335631 A | 2/2015 |
|---|---|---|
| WO | 2019032024 A1 | 2/2019 |
| WO | 2019038700 A1 | 2/2019 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 15)", 3GPP TS 36.304 V15.4.0, Jun. 2019, 55 pages.
(Continued)

*Primary Examiner* — Joseph Arevalo
(74) *Attorney, Agent, or Firm* — Murphy, Bilak & Homiller, PLLC

(57) ABSTRACT

A wireless device (12) "relaxes" the radio-signal measurements it makes with respect to a wireless communication network (10), in the context of using those measurements to determine whether a current Timing Advance, TA, value remains valid for use in transmitting on preconfigured uplink resources, PUR, of the wireless communication network (10). Relaxation refers to the length of the interval between making new measurements. According to techniques herein,
(Continued)

the wireless device (12) operates according to an imposed limit on the extent or degree of relaxation, to ensure or at least improve the reliability of the radio measurements with respect to validation of the TA value. Determination of the extent of relaxation occurs at the wireless device (12) or at a supporting network node (22) of the wireless communication network (10).

22 Claims, 15 Drawing Sheets

(51) Int. Cl.
*H04W 56/00* (2009.01)
*H04W 76/28* (2018.01)

(58) Field of Classification Search
CPC ............. H04W 56/009; H04W 64/00; H04W 74/0833; H04W 76/28; H04W 84/06
USPC .................. 370/329, 318, 330, 350, 328
See application file for complete search history.

(56) References Cited

U.S. PATENT DOCUMENTS

| | | | | |
|---|---|---|---|---|
| 2021/0321413 | A1* | 10/2021 | Shin | H04W 72/23 |
| 2021/0410181 | A1* | 12/2021 | Jeon | H04W 72/1268 |
| 2022/0085942 | A1* | 3/2022 | Kim | H04W 72/04 |
| 2022/0210868 | A1* | 6/2022 | Park | H04W 28/0278 |
| 2022/0217565 | A1* | 7/2022 | Thangarasa | H04W 56/0045 |
| 2022/0232503 | A1* | 7/2022 | Cheng | H04W 56/0045 |
| 2023/0262631 | A1* | 8/2023 | Lei | H04W 56/0045 370/350 |
| 2023/0379860 | A1* | 11/2023 | Rao | G01S 5/01 |
| 2024/0014979 | A1* | 1/2024 | Lei | H04L 5/0092 |
| 2024/0031960 | A1* | 1/2024 | Wu | H04W 56/0045 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 15)", 3GPP TS 36.304 V15.3.0, Mar. 2019, 55 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.6.0, Jun. 2019.

"Discussions on RRM requirements for transmissions using PUR for MTC", 3GPP TSG-RAN WG4 Meeting #90bis, R4-1904573, Ericsson, Xi'an, China, Apr. 8-12, 2019, 4 pages.

"Evolved Universal Terrestrial Radio Access (E-UTRA); Requirements for support of radio resource management", 3GPP TS 36.133 version 15.6.0, Jul. 2019, 3584 pages.

"Support for transmission in preconfigured UL resources for MTC", 3GPP TSG RAN WG1 Meeting #96bis, R1-1904343, ZTE, Xi'an, China, Apr. 8-12, 2019, 12 pages.

"Discussion on relaxed serving cell monitoring in Rel-16 eMTC", 3GPP TSG-RAN WG4 Meeting #90bis, R4-1903794, Huawei, HiSilicon, Xi'an, China, Apr. 8-12, 2019, 6 pages.

"Support for transmission in preconfigured UL resources for MTC", 3GPP TSG RAN WG1 Meeting #96bis, R1-1904343, ZTE, Xi'an, China, Apr. 8-12, 2019, 15 pages.

\* cited by examiner

METHOD AND APPARATUS FOR CONTROLLING TRANSMISSION ON PRECONFIGURED UPLINK RESOURCES IN A WIRELESS COMMUNICATION NETWORK

TECHNICAL FIELD

The present invention relates to the use of preconfigured uplink resources in a wireless communication network.

BACKGROUND

There has been a lot of recent work in 3GPP on specifying technologies to cover Machine-to-Machine (M2M) and/or Internet of Things (IoT) related use cases. Most recent work for 3GPP Release 13 and 14 includes enhancements to support Machine-Type Communications (MTC) with new User Equipment (UE) categories (Cat-M1, Cat-M2), supporting reduced bandwidth of 6 physical resource blocks (PRBs) (up to 24 PRBs for Cat-M2), and Narrowband IoT (NB-IoT) UEs providing a new radio interface (and UE categories, Cat-NB1 and Cat-NB2).

LTE enhancements introduced in 3GPP Release 13,14 and 15 for MTC are referred to as "eMTC", including (but not limited to) support for bandwidth limited UEs, Cat-M1, and support for coverage enhancements. This labeling is to separate discussion from NB-IoT (notation here used for any Release), although the supported features are similar on a general level.

There are multiple differences between "legacy" LTE and the procedures and channels defined for eMTC and for NB-IoT. Some important differences include a new physical channel, such as the physical downlink control channels, called MPDCCH in eMTC and NPDCCH in NB-IoT, and a new physical random access channel, NPRACH, for NB-IoT. Another important difference is the coverage level (also known as coverage enhancement level) that these technologies can support. By applying repetitions to the transmitted signals and channels, both eMTC and NB-IoT allow UE operation down to much lower SNR level compared to LTE, i.e. $Es/Iot \geq -15$ dB being the lowest operating point for eMTC and NB-IoT which can be compared to $-6$ dB Es/Iot for "legacy" LTE.

A work item in Release 16 introduces an enhancement for NB-IoT and eMTC, involving preconfigured uplink resources (PUR), also referred to as pre-allocated uplink resources. There may be different types of PUR, such as dedicated PUR allocated for a particular UE, contention-free PUR intended for non-contention use by more than one UE, and contention-based PUR, in which the involved resource(s) are preconfigured for contention-based usage.

PUR are physical channel resources, specified in terms of time and frequency allocations on the radio interface. In an LTE context, PUR comprise a Physical Uplink Shared Channel (PUSCH) allocation, for example In the case of NB-IoT, PUR resource is the same as the NPUSCH resource. For cat-M, it is the same as a PUSCH resource comprising 6 PRBs (e.g. for UE category M1) or 24 RBs (e.g. for UE category M2).

Transmissions on PUR also may involve transmission-repetition, such as used for extended or enhanced coverage. Transmitting the same information multiple times allows for successful reception of the information at lower received-signal levels than are viable absent the use of repetition. Extended coverage is useful, for example, for communicating with machine-type UEs or NB-IoT devices that have lower transmit power levels or are installed indoors or in other locations where path loss to the network is high.

In an example scenario, a UE connects to an access node or other type or radio network node in a Radio Access Network (RAN) and is provided with a Timing Advance (TA) value to use for aligning its uplink transmissions with the radio-signal frame/subframe structure used by the radio network node. The TA configured at the UE serves as an offset that is applied by the UE between the start of a received downlink subframe and a transmitted uplink subframe, to account for propagation delay between the UE and the radio network node providing the serving cell. Applying the TA value ensures that the radio network node receives the UE's uplink transmissions in proper time alignment.

While the UE is in the connected state, the network uses Radio Resource Control (RRC) signaling, for example, to allocate PUR to the UE. The UE may use the PUR to perform an uplink transmission while still in the connected state, or may use the PUR after transitioning to an idle state. In the latter scenario, the UE has the TA value configured for it by the network when it was connected and it uses that configured TA value when transmitting on the PUR, assuming that the UE has not changed cells since going idle. If the UE has changed cells—moved into the coverage area of another cell—the PUR allocation is no longer valid, nor is the configured TA value.

If the UE has not changed cells while idle, it nonetheless may be configured to check the validity of the configured TA value. For example, the UE may compare a Reference Signal Received Power (RSRP) value measured for the serving cell while the UE was connected to the serving cell—such as in conjunction with the TA value being configured for the UE—with a current or updated measurement of the RSRP for the cell. According to this approach, the UE deems the TA value to be valid or invalid in dependence on how its new RSRP measurement compares with the earlier RSRP measurement. For example, if the magnitude of the difference between the new RSRP measurement and the prior RSRP measurement is below certain threshold, then the UE deems the TA value to be valid and carries out its uplink transmission on the PUR using the TA value. On the other hand, if the difference between the earlier RSRP measurement and the new RSRP measurement exceeds the threshold, the UE deems the TA value to be invalid and it does not perform its uplink transmission on the PUR using the TA value.

Further complications arise in the context of Discontinuous Reception (DRX) cycles, such as those used in LTE or other types of networks. In LTE, a "DRX cycle" is used to enable a UE to save its battery. The DRX cycle is used in the RRC idle state, and can also be used in the RRC connected state. Examples of lengths of DRX cycles currently used in RRC idle state are 320 ms, 640 ms, 1.28 s and 2.56 s. Examples of lengths of DRX cycles currently used in RRC connected state may range from 2 ms to 2.56 s. So-called "enhanced DRX" (eDRX) cycles are expected to be very long in comparison, e.g., ranging from several seconds to several minutes and even up to one or more hours. Typical values of eDRX cycles may be between 4-10 minutes.

The DRX/eDRX cycle is configured by the network and is characterized by the following parameters:

On duration: During the on duration of the DRX cycle, a timer called 'onDurationTimer', which is configured by the network node, is running. This timer specifies the number of consecutive control channel subframes (e.g. PDCCH, ePDCCH subframe(s)) at the beginning of a DRX Cycle. It is also interchangeably called the DRX ON period. More specifically, the DRX ON period is the duration in downlink subframes that the UE is awake for receiving control channels (e.g. PDCCH, ePDCCH). If the UE successfully decodes the control channel (e.g. PDCCH, ePDCCH) during the ON duration then the UE starts a drx-inactivity timer (see below) and stays awake until its expiry. When the onDurationTimer is running, the UE is considered to be in DRX state of the DRX cycle.

DRX-inactivity timer: It specifies the number of consecutive control channel (e.g. PDCCH, ePDCCH) subframe(s) after the subframe in which a control channel (e.g. PDCCH) indicates an initial UL or DL user data transmission for this MAC entity. It is also configured by the network node. When the drx-inactivity timer is running, the UE is considered to be in non-DRX state i.e. no DRX is used.

Active time: This time is the duration during which the UE monitors the control channel (e.g. PDCCH, ePDCCH). In other words, this is the total duration during which the UE is awake. This includes the "on-duration" of the DRX cycle, the time during which the UE is performing continuous reception while the inactivity timer has not expired and the time the UE is performing continuous reception while waiting for a DL retransmission after one HARQ RTT. The minimum active time is equal to the length of an on duration, and the maximum active time is undefined (infinite).

Example DRX ON and DRX OFF durations of the DRX cycle are shown in FIG. 1. The DRX operation with more detailed parameters in LTE is illustrated in FIG. 2.

Unless otherwise noted, the term "DRX" as used herein refers to either or both legacy DRX and eDRX. In legacy DRX-related procedures, the UE can be configured with DRX cycle length of up to 2.56 seconds. But UEs supporting extended DRX (eDRX) can be configured with a DRX cycle longer than 2.56 seconds and typically much longer than 2.56 seconds, e.g., in the order of several seconds to several minutes. The eDRX configuration parameters include an eDRX cycle length, paging window length, etc. The "paging window length" may also be referred to as the paging time window (PTW) length. Within a PTW of an eDRX cycle, the UE may be configured with one or more legacy DRX cycles.

SUMMARY

A wireless device "relaxes" the radio-signal measurements it makes with respect to a wireless communication network, in the context of using those measurements to determine whether a current Timing Advance (TA) value remains valid for use in transmitting on preconfigured uplink resources (PUR) of the wireless communication network. Relaxation refers to the length of the interval between making new measurements. According to techniques herein, the wireless device operates according to an imposed limit on the extent or degree of relaxation, to ensure or at least improve the reliability of the radio measurements with respect to validation of the TA value. Determination of the extent of relaxation occurs at the wireless device or at a supporting network node of the wireless communication network.

In an example embodiment, a method performed by a wireless device configured for operation in a wireless communication network includes determining a limit on measurement relaxation, for limiting a degree of measurement relaxation used by the wireless device. The limit controls an interval between successive radio-signal measurements made by the wireless device. The method further includes the wireless device conditionally performing an uplink transmission on PUR of the wireless communication network. The wireless device conditions the transmission on the radio-signal measurements indicating that a configured TA value of the wireless device remains valid. That is, the wireless device decides whether to perform the transmission on the PUR, in dependence on whether the radio-signal measurements indicate that the configured TA value is still valid. Here, the wireless devices uses the configured TA value to control a timing of the uplink transmission.

As another example embodiment, a wireless device includes communication circuitry that is configured to transmit signals to and receive signals from a wireless communication network. Further, the wireless device includes processing circuitry that is operatively associated with the communication circuitry and configured to determine a limit on measurement relaxation, for limiting a degree of measurement relaxation used by the wireless device. The limit controls an interval between successive radio-signal measurements made by the wireless device, and the processing circuitry is further configured to perform an uplink transmission on PUR of the wireless communication network, in dependence of the radio-signal measurements indicating that a configured TA value of the wireless device remains valid. The configured TA value is used by the wireless device to control a timing of the uplink transmission.

In another embodiment, a method performed by a radio network node configured for operation in a wireless communication network includes the radio network node determining a limit on measurement relaxation, for limiting a degree of measurement relaxation used by a wireless device. The limit controls an interval between successive radio-signal measurements made by the wireless device, where the measurements are used by the wireless device for validating a TA value as a condition for performing an uplink transmission on PUR of the wireless communication network. The method further includes the radio network node transmitting an indication of the limit for the wireless device.

In a related embodiment, a radio network node includes communication circuitry that is configured to transmit signals to and receive signals from a wireless communication device and processing circuitry that is operatively associated with the communication circuitry. The processing circuitry is configured to determine a limit on measurement relaxation, for limiting a degree of measurement relaxation used by the device. The limit controls the interval between successive radio-signal measurements that are made by the wireless device and used for validating a TA value as a condition for the wireless device performing an uplink transmission on PUR of the wireless communication network. The processing circuitry is further configured to transmit an indication of the limit for the wireless device.

In another embodiment a computer program is provided which comprises instructions which, when executed by at least one processor, causes the processor to carry out any one of the methods steps described above.

In another embodiment a carrier is provided which contains a computer program comprising instructions which, when executed by at least one processor, causes the processor to carry out any one of the methods steps described above. In some examples the carrier is one of an electronic signal, optical signal, radio signal, or computer readable storage medium.

Of course, the present invention is not limited to the above features and advantages. Indeed, those skilled in the art will recognize additional features and advantages upon reading the following detailed description, and upon viewing the accompanying drawings.

DETAILED DESCRIPTION

As one aspect of this disclosure, it is recognized herein that there exist certain challenge(s) regarding controlling transmissions on PUR. For example, a UE that makes an uplink transmission on PUR while in the RRC idle state uses the TA value previously provided to the UE while the UE was in the RRC connected state, to perform that transmission. Even where the UE remains in the cell for which the TA value was valid, the UE still may need to perform measurements—e.g., RSRP signal measurements—to determine whether the TA value remains valid. With DRX or for other reasons, however, the UE may perform such measurements on a more "relaxed" basis, e.g., at longer intervals and/or with reduced accuracy. As such, the UE may not be in a good position, operationally speaking, to validate the TA value before making the uplink transmission on the PUR.

Figure 1:
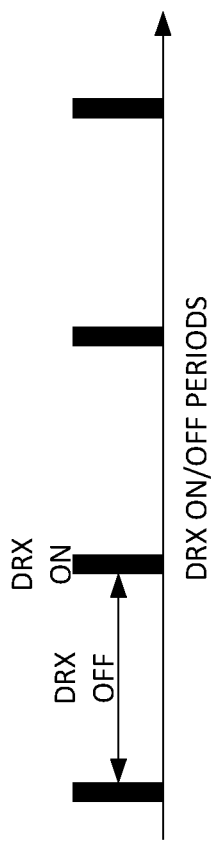
FIG. 1 is a diagram of example on and off durations of a Discontinuous Reception (DRX) cycle, as may be used by a wireless device for operation with respect to a wireless communication network.
Figure 2:
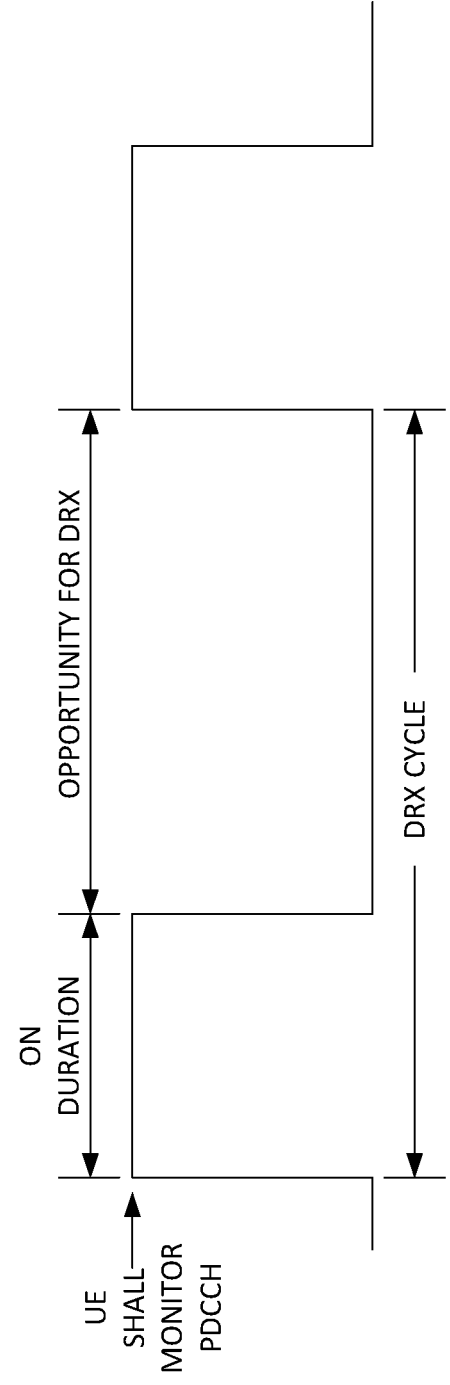
FIG. 2 is a diagram of additional example details regarding DRX cycles.
Figure 3:
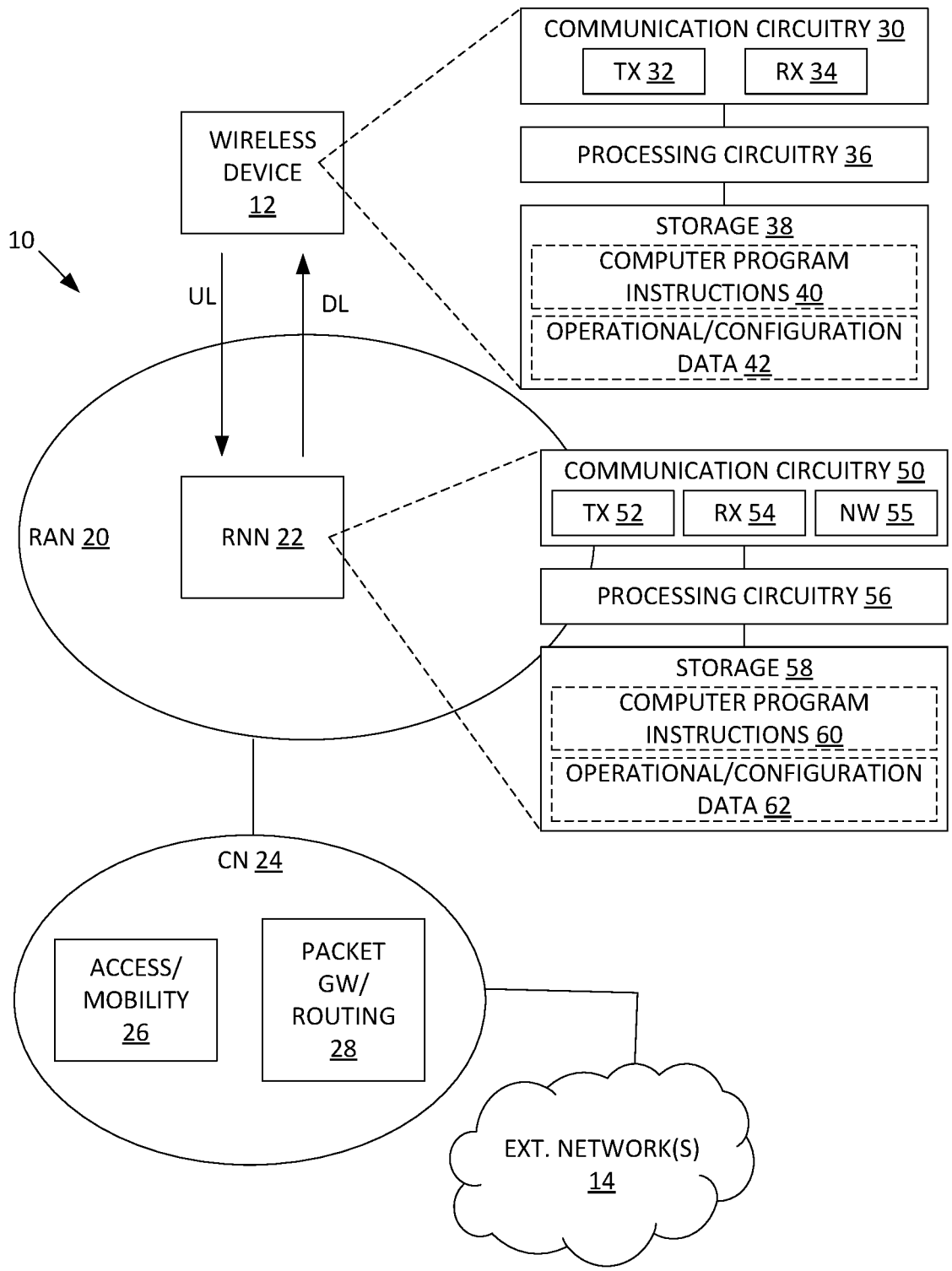
FIG. 3 is a block diagram of one embodiment of a wireless communication network.

FIG. 3 illustrates an example wireless communication network 10, although its specific depictions should be understood as non-limiting and any device or node names or related terminology should not be construed as limiting the depiction to a specific type or generation of network. In an example case, the network 10 is configured according to Third Generation Partnership Project (3GPP) technical specifications. Particularly, the network 10 may be a Long Term Evolution (LTE) network, and LTE-Advanced network, or a Fifth Generation (5G) network based on the New Radio (NR) specifications. Additionally, the network 10 could be a hybrid or otherwise include more than one Radio Access Network (RAN) and/or use more than one Radio Access Technology (RAT).

With the above qualifiers in mind, the depicted network 10 provides one or more communication services to one or more types of wireless communication devices, such as smart phones and other personal computing devices, MTC devices, NB-IoT devices, etc. For simplicity, the diagram depicts one wireless device 12, with the understanding that the network 10 may support many devices of many different types. Likewise, the network 10 may offer a range of communication services, one or more of which may involve communicatively coupling the wireless device 12 to one or more external networks 14, such as the Internet or another Packet Data Network (PDN).

The network 10 includes a RAN 20 having one or more radio network nodes (RNNs), with one node 22 depicted for simplicity. The RNNs 22 may be of the same type or of differing types—e.g., in heterogenous network deployments using different types of radio nodes with different coverages or other capabilities. The RNNs 22 may be referred to using other terms, such as access points, base stations, etc., and the broader aspects of the RNN architecture may be varied without departing from the operational configurations and hardware implementations of interest herein.

A core network (CN) 24 included in the network 10 communicatively couples to the external network(s) 14 and provides various supporting management and control operations, such as managing access, authentication, and mobility of wireless devices 12 accessing the network 10, along with providing data connectivity/routing for user traffic going to or coming from respective ones of the wireless devices 12 that are connected to the network 10.

Figure 4A:
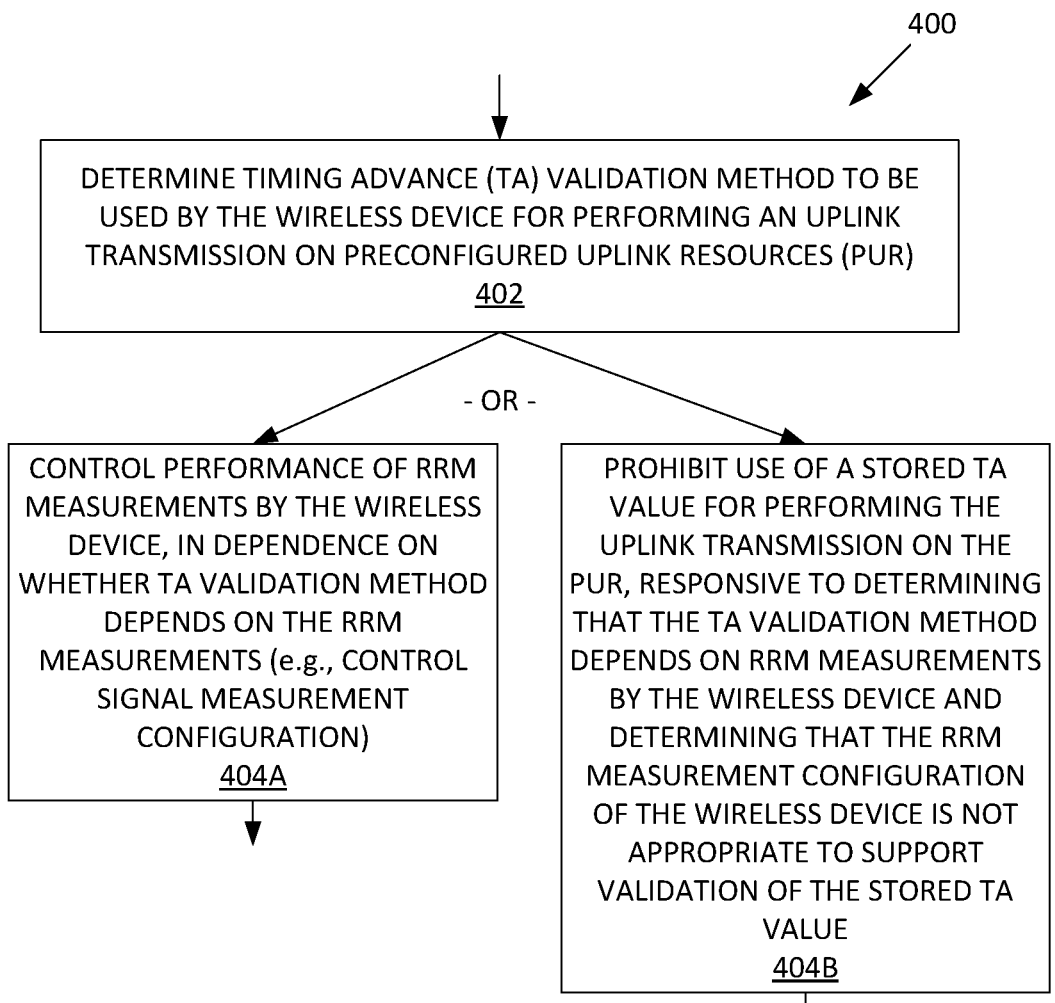
FIG. 4A is a logic flow diagram of one embodiment of a method of operation by a wireless device.

Looking ahead momentarily to FIG. 4A, the wireless device 12 in one or more embodiments performs a method 400, which may be carried out as part of ongoing operations at the wireless device 12, and which may be looped or repeated or otherwise carried out as needed.

The method 400 includes the wireless device 12 determining (Block 402) a Timing Advance (TA) validation method to be used by the wireless device 12 for performing an uplink transmission on preconfigured uplink resources (PUR). For example, the network 10 indicates the PUR to the wireless device 12 while the wireless device 12 is connected to a particular Radio Network Node (RNN) 22 in the network 10, and indicates the TA validation method to be used by the wireless device 12 when later deciding whether the TA value received by the wireless device 12 for communication with the RNN 22 remains valid for use in setting the uplink transmission timing of the wireless device 12 when performing an uplink transmission on the PUR.

In one or more embodiments, the method 400 further includes the wireless device 12 controlling (Block 404A) its performance of Radio Resource Management (RRM) measurements, in dependence on whether the TA validation method depends on the RRM measurements. Here, the term "RRM measurements" should be construed broadly, to encompass essentially any signal measurements performed by the wireless device 12 on network signals transmitted by the RNN 22 and/or one or more of its neighboring RNNs 22. In one or more embodiments, the RNN 22 transmits a reference signal, and the RRM measurements constitute the wireless device 12 performing Reference Signal Received Power (RSRP) measurements on the reference signal.

Further, saying that the wireless device 12 controls its performance of the RRM measurements in dependence on whether the TA validation method depends on the RRM measurements should be understood broadly. Consider an example case where the wireless device 12 is in a connected mode and being served by the RNN 22. The RNN 22 indicates PUR to the wireless device 12, sets or maintains the TA used by the wireless device 12 for transmitting to the RNN 22 by sending one or more TA values to the wireless device 12 while the wireless device 12 is connected to the RNN 22, and configures the TA validation method to be used by the wireless device 12 for determining whether the TA value it has stored for the RNN 22 is valid for use by the wireless device 12 when performing an uplink transmission on the PUR. For example, the wireless device 12 may have gone idle and there is, therefore, uncertainty about whether the TA value configured in the wireless device 12 for the RNN 22 is still valid.

While there are various validation methods that the RNN 22 may configure at the wireless device 12 for use by the wireless device 12 in validating its stored TA value, at least one such validation method depends on RRM measurements made by the wireless device 12. For example, in one validation method, the wireless device 12 determines the Reference Signal Received Power (RSRP) for a reference signal transmitted by the RNN 22 in conjunction with the most recent TA value received from the RNN 22. The wireless device 12 stores the TA value as a configured TA value and stores the corresponding RSRP measurement results in logical association with the configured TA value. Subsequently, the wireless device 12 can determine whether the configured TA value is still valid for use by comparing the stored RSRP measurement results with a "current" measurement of the RSRP for the RNN's reference signal.

The idea here is that if the current RSRP measurement is the same or sufficiently close to the stored RSRP measurement, the configured TA value is likely to be appropriate for use in transmitting to the RNN 22. However, the "current" RSRP at the wireless device 12 may be, for example, the most recent RSRP measurement made by the wireless device 12 with respect to the RNN 22. Therefore, if the wireless device 12 is operating with a degree of measurement relaxation that entails long intervals between RSRP measurements, the most recent RSRP measurement available at the wireless device 12 may be stale, meaning that using it for comparison against the RSRP measurement results stored for the configured TA value yields an unreliable validation of the configured TA value.

Therefore, in at least one contemplated embodiment, the wireless device 12 checks whether the TA validation method it is configured to use depends on RRM measurements and, if so, it avoids relaxing its measurements and, instead, uses its "normal" measurements even if its operating circumstances or default behavior would otherwise cause it to operate with relaxed measurements. That is, either according to standards-specified conditions or according to a proprietary design, the wireless device 12 may be configured to select between normal measurement operations and relaxed measurement operations (or to select the degree of measurement relaxation) based on certain triggers or operating conditions.

Unless otherwise noted, the term "relaxed measurements" refers to making/updating certain radio-signal measurements less frequently than would otherwise be done. For example, if "normal measurements" implies a certain interval or timing for performing measurements, then repeating those measurements on a longer interval represents a relaxation of the measurements, with the "degree" of relaxation referring to the amount or extent of lengthening of the interval. At least for discussion purposes, the wireless device 12 may be referred to as operating in "normal" or "relaxed" measurement modes, where the relaxed mode may allow for varying degrees of relaxation.

For example, if the wireless device 12 is operating in DRX or is otherwise operating in an idle mode or any lower-power or lower inactivity state, it may be configured to use relaxed measurements automatically, to complement its low-activity state. In at least one embodiment contemplated herein, a wireless device 12 configured to use one or more of the techniques disclosed herein would override that automatic behavior and avoid operating with relaxed measurements (or limit the degree of relaxation), to improve the reliability of TA validation.

The normal measurement mode—"normal" measurements—specifies, for example, a certain periodicity or certain triggers for performing RRM measurements, such that the wireless device 12 makes RRM measurements more often and/or with greater accuracy when operating with normal measurements, as compared to when operating with relaxed measurements. Alternatively, to the extent that there are "degrees" or "levels" of measurement relaxation—e.g., expressed as a relaxation factor "N"—the wireless device 12 may control or otherwise limit the extent of measurement relaxation permitted.

Broadly, the normal measurement mode is more stringent than a relaxed measurement mode in one or more respects. For example, a relaxed measurement mode may use longer intervals between making measurements on the reference signal of the RNN 22. In this regard, the wireless device 12 operating with relaxed measurements would not detect changes in RSRP of the reference signal as quickly as it would if it were operating with normal measurements. Hence, the relaxed-mode measurements would not be as fresh or reliable, as compared to normal-mode measurements, for use in assessing whether the stored TA value remains valid. That is, to the extent that the wireless device 12 lengthens the interval between making new radio-signal measurements, the most recent measurements made by the wireless device 12 are allowed to age longer before being updated, increasing the risk that its most recent measurements are not reflective of the current channel conditions.

To better understand the details immediately above, consider a scenario where a wireless device 12 connects to an RNN 22. While the wireless device 12 is connected to it, the RNN 22 may indicate PUR for use by the wireless device 12. The wireless device 12 may later decide to perform an uplink transmission on the PUR and that transmission must be transmitted with the appropriate uplink timing adjustment, for proper reception at the RNN 22. If, however, the wireless device 12 is in the idle mode at the time it decides to perform the uplink transmission, the only TA value it has for the RNN 22 is one provided to it earlier by the RNN 22 before the wireless device 12 went idle.

To assess whether that stored (configured) TA value is still valid, the wireless device 12 can compare its most current signal measurements for the RNN 22 with the signal measurements made by the wireless device 12 at a time corresponding to the determination of the TA value by the RNN 22. That is, if the RSRP or other type of signal measurement is the same now as it was when the TA value was determined, the wireless device 12 may surmise that the TA value is still valid for use. Here, the word "same" may be understood to mean substantially the same within some permissible range or threshold of difference.

Thus, to have a "good" signal measurement for comparison to the prior signal measurement associated with the TA value stored in the wireless device 12, the wireless device 12 needs a sufficiently recent and/or accurate signal measurement. Correspondingly, the wireless device 12 may configure its RRM measurements to avoid having outdated or insufficiently accurate RRM signal measurements for use in the comparison.

As an alternative to the operations of Block 404A, the wireless device 12 may prohibit (Block 404B) the use of the stored TA value for performing an uplink transmission on the PUR, in response to determining that the TA validation method depends on RRM measurements and further in response to determining that the RRM measurement configuration of the wireless device 12 is not appropriate to support such validation (at least not at the required level of reliability). Thus, where the operations of Block 404A can be understood as the wireless device 12 controlling its RRM measurement configuration to ensure that the measurements will be suitable for use in determining the validity of the TA value, the operation of Block 404B can be understood as the wireless device 12 allowing the use of more relaxed RRM measurements configurations while avoiding making an unreliable validation of the stored TA value.

Figure 4B:
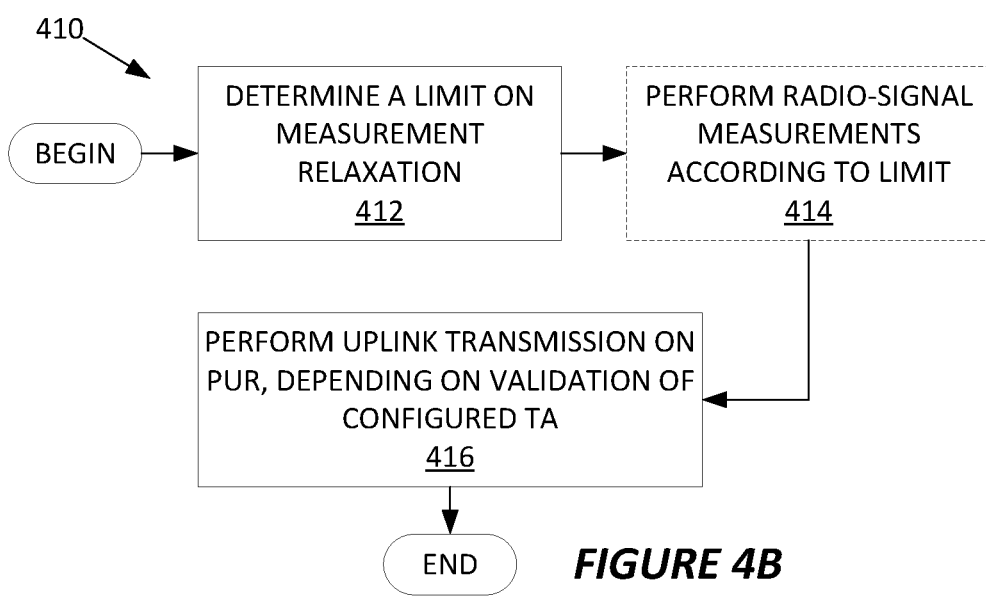
FIG. 4B is a logic flow diagram of one embodiment of a method of operation by a wireless device.

FIG. 4B depicts another example method of operation by a wireless device 12 and can be understood as a generalization of the method 400. In more detail, FIG. 4B illustrates a method 410 of operation by a wireless device 12 configured for operation in a wireless communication network 10. The method 410 includes the wireless device 12 determining (Block 412) a limit on measurement relaxation, for limiting a degree of measurement relaxation used by the wireless device 12. The limit controls an interval between successive radio-signal measurements made by the wireless device 12 with respect to the wireless communication network 10.

The method 410 further includes the wireless device 12 performing (Block 416) an uplink transmission on PUR of the wireless communication network 10, depending on whether the radio-signal measurements indicates that a configured TA value of the wireless device 12 remains valid. The configured TA value is used by the wireless device 12 to control a timing of the uplink transmission, and it will be understood that the method 410 implicitly includes or relies on the wireless device 12 performing (Block 414) relaxed measurements according to the determined limit on relaxation.

Determining (Block 412) the limit comprises, for example, the wireless device 12 determining a limit on a relaxation factor. Here, the relaxation factor may be an integer multiple of a DRX cycle configured for the wireless device 12. As one example, determining the limit on the relaxation factor comprises the wireless device 12 restricting a maximum allowed value of the relaxation factor as a function of the length of the DRX cycle. The limit may also be determined as a limit on the length of a DRX cycle used by the wireless device 12.

The "determining" in all such examples comprises, in at least one implementation, the wireless device 12 receiving an indication of the limit via control signaling transmitted by a radio network node of the wireless communication network 10. That is, the wireless device may "determine" the limit based on its own calculations or operating logic, or may "determine" the limit based on receiving signaling from the network 10 that indicates the limit to be used.

As for the radio-signal measurements used for TA validation, in one or more embodiments they comprise received-signal power measurements made by the wireless device 12 during operation in the relaxed measurement mode. For example, the wireless device 12 measures the received-signal power on a reference signal transmitted for a cell of the wireless communication network 10 that is a serving cell for the wireless device 12. As a specific example, the radio-signal measurements are Radio Resource Measurements (RRM), as configured by the wireless communication network 10.

In at least one embodiment, the method 410 includes the wireless device 12 deciding whether the configured TA value remains valid, in dependence on comparing a current Reference Signal Received Power (RSRP) measurement made by the wireless device 12 with respect to a serving cell of the wireless communication network 10, with a prior RSRP measurement made by the wireless device 12 with respect to the serving cell at a time when the configured TA value was valid.

The method 410 also may include or at least rely on the wireless device 12 receiving the configured TA value while the wireless device 12 operates in a connected mode with respect to the wireless communication network 10, and the wireless device 12 subsequently transitioning from the connected mode into the relaxed measurement mode.

Figure 5A:
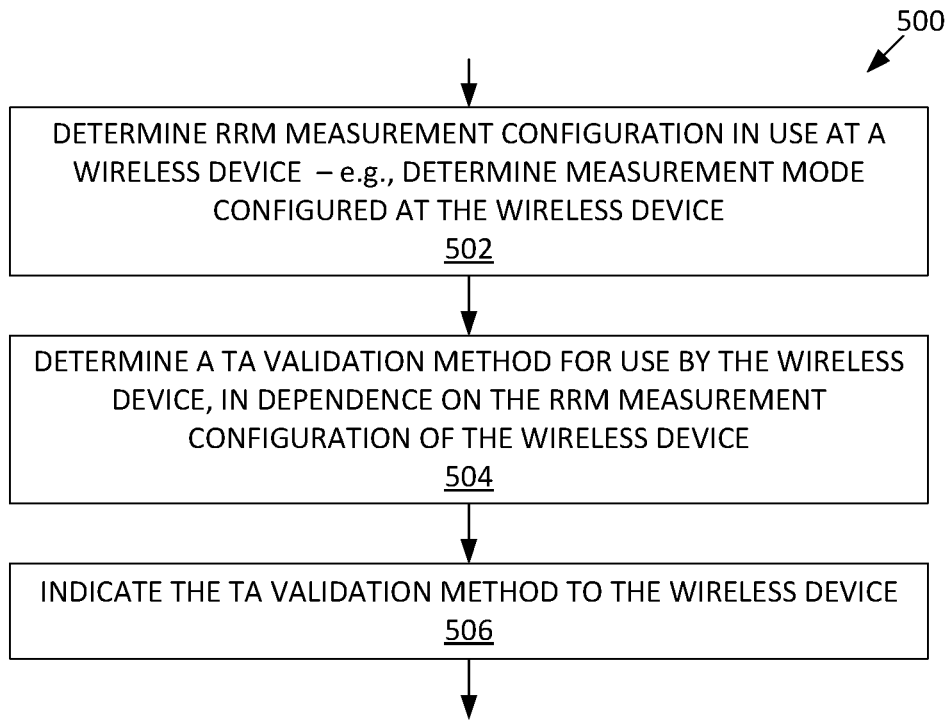
FIG. 5A is a logic flow diagram of one embodiment of a method of operation by a radio network node.

FIG. 5A illustrates a network-side method 500, such as may be carried out in a RNN 22 or other type of network node. For example, another node in the RAN 20 or in the CN 24 may perform the method 500. Further, the method 500 may be performed on a distributed basis, e.g., jointly or in cooperation between two or more nodes, and at least a portion of it may be implemented in a cloud environment, e.g., a data/processing center remote from the involved RNN 22/RAN 20.

The method 500 includes determining (Block 502) the RRM measurement configuration in use at a wireless device 12, which may entail determining whether the wireless device 12 is configured to use a "normal" measurement mode or a "relaxed" measurement mode. More broadly, the operations in Block 502 may be understood as the network node(s) carrying out the method 500 determining whether the wireless device 12 is configured to perform RRM measurements in a manner resulting in those measurements being suitable for the wireless device 12 to use in performing TA validation. "Suitable" means, for example, sufficiently current and/or sufficiently accurate.

The method 500 continues with the network node(s) determining (Block 504) a TA validation method for use by the wireless device 12, in dependence on the RRM measurement configuration of the wireless device 12. For example, if the network node(s) determines that the wireless device 12 has an RRM measurement configuration expected to yield measurements suitable for use in TA validation, the network node(s) may pick a validation method that depends on such measurements. Otherwise, the network node(s) may avoid any TA validation method that depends on such measurements, choosing instead to configure the wireless device 12 to use a TA validation method that does not depend on such measurements.

Further, the method 500 includes the network node(s) indicating (Block 506) the TA validation method to the wireless device 12. The indication may be sent via RRC signalling and may comprise sending an index or other identifier that maps to the selected TA validation method.

The method 500 may be carried out when the wireless device 12 connects to an RRN 22 in the network 10, or, more generally, while the wireless device 12 is connected to the network 10 and PUR are allocated for use by the wireless device 12. In this regard, the network node(s) may determine the RRM measurement configuration of the wireless device 12 based on the wireless device 12 indicating its configuration to the network 10, or based on the network 10 knowing one or more operating conditions of or for the wireless device 12, and knowing how those operating conditions dictate the RRM measurement configuration chosen by the wireless device 12.

Figure 5B:
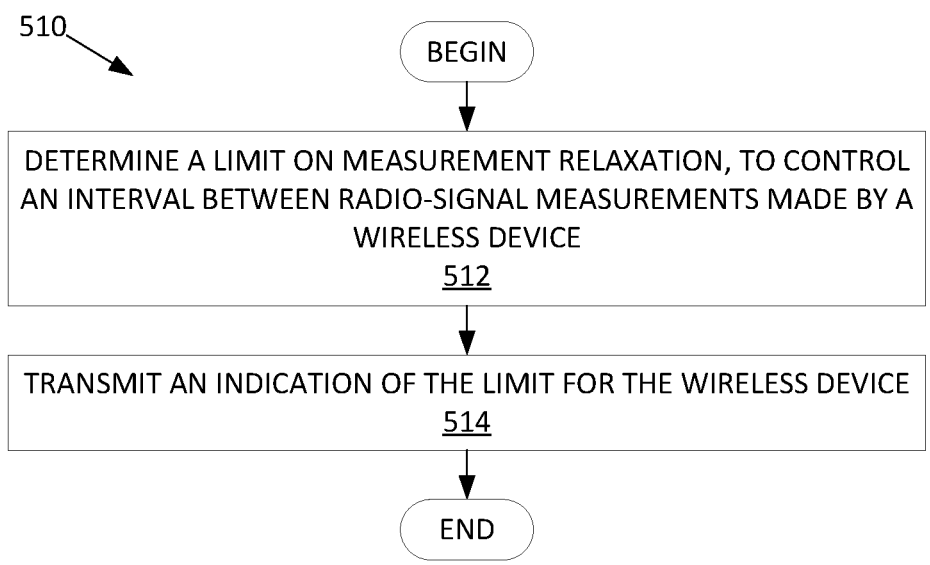
FIG. 5B is a logic flow diagram of one embodiment of a method of operation by a radio network node.

FIG. 5B illustrates another example embodiment of a method of operation by a network node, such as the RNN 22 depicted in FIG. 3. The method may be understood as a generalization of the method 500, or as a complement to the method 500.

In more detail, FIG. 5B depicts a method 510 of operation by an RNN 22 configured for operation in a wireless communication network 10. The method 510 includes the RNN 22 determining (Block 512) a limit on measurement relaxation, for limiting a degree of measurement relaxation used by a wireless device 12. The limit controls an interval between successive radio-signal measurements that are made by the wireless device 12 with respect to the wireless communication network 10 and are used by the wireless device 12 for validating a TA value as a condition for performing an uplink transmission on PUR of the wireless communication network 10. The method 510 further includes the RNN 22 transmitting (Block 512) an indication of the limit for the wireless device 12.

Transmitting (Block 512) the indication of the limit comprises, for example, transmitting the indication via a cell of the wireless communication network 10 that is a serving cell for the wireless device, either using dedicated signaling to the wireless device 12 or using broadcasted signaling. As one example, the RNN 22 operates as a serving node with respect to the wireless device 12 and provides the indication to the wireless device 12 over a radio link between the wireless device 12 and the RNN 22 at a time when the wireless device 12 is in a connected or active mode with respect to the wireless communication network 10. In another example, the wireless device 12 operates in idle mode and receives the signaling as broadcasted signaling.

In at least one embodiment, the limit comprises a limit on a maximum value permitted for a relaxation factor that serves as an integer multiple of a length of a DRX cycle associated with operation of the wireless device 12 during the relaxed measurement mode. The method 510 in such embodiments includes determining the limit as a function of the length of the DRX cycle. Additionally, or alternatively, the limit comprises a limit on a maximum length of the DRX cycle associated with operation of the wireless device 12 during the relaxed measurement mode.

Turning back to FIG. 3, an example wireless device 12 comprises communication circuitry 30, such as a wireless modem circuit or module, including a radiofrequency transceiver comprising a transmitter 32 and a receiver 34. Such circuitry may include the radio front-ends for transmitting and receiving signals via one or more antennas of the wireless device 12 (not shown), along with analog-to-digital and digital-to-analog conversion stages for going between the analog and digital signal domains. Such circuitry may further comprise at least a portion of the baseband signal processing for signal reception and transmission, or such processing may be subsumed in the illustrated processing circuitry 36, which may comprise fixed circuitry, programmatically-configured circuitry, or a mix of fixed and programmatically-configured circuitry.

The wireless device 12 in one or more embodiments further includes storage 38, which may be integrated with or apart from the processing circuitry 36. The storage 38 provides, for example, short-term working memory for program execution and data-processing. Additionally, or alternatively, the storage 38 provides longer-term storage for computer-program instructions 40, for execution by the processing circuitry 36, and may store various items of operational or configuration data 42. Consequently, the storage 38 comprises one or more types of computer-readable media, such as DRAM, SRAM, FLASH, SSD, etc.

In at least one embodiment, the storage 38 stores computer-program instructions 60 that, when executed by the processing circuitry 36 of the wireless device 12, causes the wireless device 12 to carry out the method 400 and/or the method 410, as described above.

More generally, an example wireless device 12 includes communication circuitry 30 that is configured to transmit signals to and receive signals from a wireless communication network, such as the example network 10 depicted in FIG. 3. Further, the example wireless device 12 includes processing circuitry 36 that is operatively associated with the communication circuitry 30. Here, "operatively associated" means that the processing circuitry 36 sends and receives messages or other data or signaling to and from other entities, such as a RNN 22, via the communication circuitry 30.

The processing circuitry 36 is configured to determine a limit on measurement relaxation, for limiting a degree of measurement relaxation used by the wireless device 12. The limit controls an interval between successive radio-signal measurements that are made by the wireless device 12 with respect to the wireless communication network 10. Further, the processing circuitry 36 is configured to perform an uplink transmission on PUR of the wireless communication network 10, depending on whether the radio-signal measurements indicate that a configured TA value of the wireless device 12 remains valid. The configured TA value is used by the processing circuitry 36 to control a timing of the uplink transmission.

In an example embodiment, the processing circuitry 36 is configured to determine the limit as a limit on a relaxation factor, the relaxation factor being an integer multiple of a DRX cycle configured for the wireless device 12. For example, the processing circuitry 36 is configured to determine the limit on the relaxation factor as a function of the length of the DRX cycle. As another example, the processing circuitry 36 is configured to determine the limit by determining a limit on the length of a DRX cycle used by the wireless device 12. The limit may be jointly determined—e.g., limits on both the maximum value allowed for the relaxation factor and the maximum DRX interval allowed.

In one or more embodiments, the processing circuitry 36 is configured to determine the limit by receiving an indication of the limit via control signaling transmitted by a RNN 22 of the wireless communication network 10. In one or more other embodiments, the wireless device 12 determines the limit as a local calculation or determination.

The radio-signal measurements at issue comprise received-signal power measurements, for example, as made by the wireless device 12 on a reference signal transmitted for a cell of the wireless communication network 10 that is a serving cell for the wireless device 12. Here, the serving cell may be one selected for camping on or otherwise monitoring by the wireless device 12, while operating in the relaxed measurement mode, and it may be the most recent serving cell used for serving the wireless device 12 while the wireless device 12 was in an active or connected mode with respect to the wireless communication network 10. As a specific example, the radio-signal measurements are RRM, as configured by the wireless communication network 10.

Regarding the "configured TA value," in one or more embodiments, the processing circuitry 36 is configured to receive the configured TA value while the wireless device 12 operates in a connected mode with respect to the wireless communication network 10. The wireless device 12 subsequently transitions from the connected mode into the relaxed measurement mode. As such, the "configured TA value" may be the last (most recent) TA value provided to the wireless device 12 by the wireless communication network 10.

In deciding whether the configured TA value remains valid, in at least one embodiment the processing circuitry 36 is configured to make the decision in dependence on comparing a current RSRP measurement made by the wireless device 12 with respect to a serving cell of the wireless communication network 10, with a prior RSRP measurement made by the wireless device 12 with respect to the serving cell at a time when the configured TA value was valid. Here, the current RSRP measurement is, for example, the most recent RSRP measurement made by the wireless device 12 according to its relaxed measurement operations.

FIG. 3 also depicts an example RNN 22 as comprising communication circuitry 50, such as a wireless modem circuit or module (or pools of such resources), including a radiofrequency transceiver comprising a transmitter 52 and a receiver 54. Such circuitry may include the radio front-ends for transmitting and receiving signals via one or more antennas of the RNN 22 (not shown), along with analog-to-digital and digital-to-analog conversion stages for going between the analog and digital signal domains. Such circuitry may further comprise at least a portion of the baseband signal processing for signal reception and transmission, or such processing may be subsumed in the illustrated processing circuitry 56, which may comprise fixed circuitry, programmatically-configured circuitry, or a mix of fixed and programmatically-configured circuitry.

The communication circuitry 50 may further include one or more network (NW) interfaces 55 for communicating with one or more other nodes in the network 10, such as other RNNs 22 and/or various nodes in the CN 24. For example, the NW interface(s) 55 comprise one or more wired or wireless interfaces and associated protocol processors, for communicatively coupling to other nodes in the network 10, in accordance with the applicable communication protocols.

The RNN 22 in one or more embodiments further includes storage 58, which may be integrated with or apart from the processing circuitry 56. The storage 58 provides, for example, short-term working memory for program execution and data-processing. Additionally, or alternatively, the storage 58 provides longer-term storage for computer-program instructions 60, for execution by the processing circuitry 56, and may store various items of operational or configuration data 62. Correspondingly, the storage 58 comprises one or more types of computer-readable media, such as DRAM, SRAM, FLASH, SSD, etc.

In at least one embodiment, the storage 58 stores computer-program instructions 60 that, when executed by the processing circuitry 56 of the RNN 22, causes the RNN 22 to carry out the method 500 and/or the method 510, as described above.

More generally, an RNN 22 includes communication circuitry 50 configured to transmit signals to and receive signals from a wireless communication device, e.g., the wireless device 12 depicted in FIG. 3. Further, the RNN 22 includes processing circuitry 56 that is operatively associated with the communication circuitry 50.

The processing circuitry 56 is configured to determine a limit on measurement relaxation, for limiting a degree of measurement relaxation used by a wireless device 12. The limit controls an interval between successive radio-signal measurements that are made by the wireless device 12 with respect to the wireless communication network 10 and are used by the wireless device 12 for validating a TA value as a condition for performing an uplink transmission on PUR of the wireless communication network 10. As an example, the RNN 22 configures the PUR before the wireless device 12 transitions into an idle mode, and the processing circuitry 56 is further configured to transmit an indication of the limit for the wireless device 12.

In at least one embodiment, the processing circuitry 56 is configured to transmit the indication of the limit via a cell of the wireless communication network 10 that is a serving cell for the wireless device 12. For example, the radio network node 22 provides or otherwise controls the serving cell in question and operates as a serving node with respect to the wireless device 12, and it transmits the indication in the serving cell either using dedicated signaling or broadcasted signaling.

As one example, the limit comprises a limit on a maximum value permitted for a relaxation factor that serves as an integer multiple of a length of a DRX cycle associated with operation of the wireless device 12 during the relaxed measurement mode, and the processing circuitry 56 is configured to determine the limit as a function of the length of the DRX cycle. In another example, the limit comprises a limit on the maximum length of the DRX cycle.[PH1]

By way of offering examples of specific embodiments but without imposing limitations on the scope of the contemplated processes and machines (apparatuses), consider a first example embodiment of a User Equipment (UE), which may be broadly understood as another term for a wireless device 12. The involved network allocates PUR for the UE and provides a TA value for the UE to use for adjusting its uplink transmission timing, and the UE must later, in contemplation of performing an uplink transmission on the PUR, determine whether that TA value is still valid. For example, a TA value provided to the UE for a serving cell/serving RNN 22 of the network 10 before the UE transitions from the connected mode to the idle mode operation is stored in the UE and will be used by the UE later, to perform a transmission on the PUR, subject to the UE determining that the stored TA value remains valid.

In this context, the UE may adapt its criteria for entering the relaxed measurement mode—i.e., for deciding whether to increase the interval between successive radio-signal measurements. Here, the "increase" may be relative to a default or normal behavior. In a first example, the UE enters a relaxed measurement mode with respect to serving-cell measurements, meaning that it relaxes its measurements on one or more radio signals of the serving cell. In a second example, the UE enters a relaxed measurement mode with respect to one or more neighboring cells, neighboring the serving cell. In a third example, the UE operates with relaxed measurements for both the serving cell and the neighbor cell(s). In addition, it is assumed that the UE is configured to validate the TA in IDLE state using the serving cell RSRP change method.

In a first aspect of the first UE embodiment, the UE is operating in a scenario where it is configured to use the serving-cell RSRP change method for performing TA validation, which means that the reliability of that validation depends on the sufficiency of its RSRP measurements. When operating in a normal mode for measuring RSRP, the measurements are suitable for use in validating the stored TA value. However, when operating in a relaxed mode for measurement RSPR, the measurements are not suitable for use in validating the stored TA value. As a qualifier, there may be degrees or extents of measurement relaxation, meaning that some degrees of relaxation may still yield measurements suitable for TA validation, while further degrees (more relaxed) do not.

Thus, the UE first determines whether it is operating in normal mode or relaxed mode (or determines the degree of relaxation, e.g., in terms of the interval between RSRP measurements, the accuracy of such measurements, etc.). The UE then determines whether the TA validation method to be used by it depends on the UE's RSRP measurements. If so, and if the UE measurement mode is relaxed (or beyond a defined degree or threshold or relaxation), the UE avoids using the stored TA value for performing an uplink transmission on the PUR by automatically declaring the TA value to be invalid, or by otherwise taking action to obtain a new TA value or coordinating with the network regarding the uplink transmission.

On the other hand, if the obtained information indicates that the UE is not in relaxed measurement mode (or if the degree of relaxation is acceptable), then the UE validates the received TA using the serving cell RSRP change method and makes it decision as to whether the TA value can be used for performing the uplink transmission on the PUR, based on the results of the validation.

In a second aspect of the first UE embodiment, it is assumed that the UE is in relaxed measurement mode with respect to serving cell. The UE further obtains information about the relaxation factor (N) and using that for adapting the TA validation method using serving cell RSRP change for PUR transmission. More specifically, if N is greater than a certain threshold (T), then the UE declares the TA validation using serving cell RSRP change as failure. Consequently, it may transmit the intended data using an EDT procedure or it may perform a random access to enter the CONNECTD state. On the other hand, if N is <T, the UE may validate the received TA using the serving cell RSRP change method.

In an example embodiment on the network side, a network node obtains information about a UE's measurement configuration (e.g., whether the UE is using a relaxed measurement mode), and, based on that information, selects and configures the UE with a TA validation method for PUR transmission. For example, if the network node determines that the UE is configured for operation in a relaxed measurement mode (or for operation with a relaxation factor N greater than some threshold), the network node chooses a TA validation method for use by the UE that does not depend on RSRP measurements (where RSRP measurements are an example of the earlier-mentioned RRM measurements).

Another embodiment is related to a wireless devices obtaining information related to TA validation method for PUR transmission in its serving cell and uses that information for adapting its criteria for entering the relaxed (serving) cell measurement mode:

In a first aspect of the third embodiment if the obtained information indicates that the UE is configured with a particular TA validation method for PUR transmission, then it remains in normal measurement mode (i.e. measures the serving cell periodically as in legacy systems in every DRX cycle) regardless of other criteria for entering the relaxed (serving) cell measurement mode. An example of the particular TA validation method is the one based on the serving cell RSRP change. On the other hand, if it is not configured with the particular TA validation method (e.g. not with the one based on serving cell RSRP change) or if it is not configured with PUR at all, then the UE is allowed to enter the relaxed measurement mode based on existing criteria.

In a second aspect of the third embodiment if the obtained information indicates that the UE is configured with a particular TA validation method for PUR transmission then it may enter in relaxed measurement mode but with specific set of one or more configuration parameters. An example of the particular TA validation method is the one based on the serving cell RSRP change. For example, the UE may use relaxation factor (N) with which it measures on serving cell not larger than certain threshold (H). Therefore, H is associated with the particular TA validation method. The parameter, H, can be predefined or it can be configured by the network node. The values of H may further depend on the DRX cycle. If the obtained information indicates that the UE is not configured with the particular TA validation method for PUR transmission then it may enter in relaxed measurement mode as in legacy i.e. not with any specific values of N associated TA validation method/PUR operation.

The embodiments are described for using PUR in RRC_IDLE state. But they are applicable for UE operation in any low activity state of the UE. Examples of low activity states are RRC_IDLE, RRC_INACTIVE, any state where the UE context is known to one or more cells in a group of cells etc.

Worth noting is that the term "network node" as used herein may correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC), MDT, test equipment (physical node or software), etc.

In some embodiments the non-limiting term user equipment (UE) or wireless device is used, and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, ProSe UE, V2V UE, V2X UE, etc.

The embodiments are described for LTE e.g., MTC and NB-IoT. However, the contemplated techniques are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000, 5G, NR, etc.

The term "time resource" as used herein may correspond to any type of physical resource or radio resource expressed in terms of length of time. Examples of time resources are: symbol, mini-slot, time slot, subframe, radio frame, TTI, short TTI, interleaving time, etc.

Consider a scenario comprising a UE served by a first cell (cell1) of a wireless communication network. Cell1 is managed or served or operated by a network node (NW1) e.g. a base station. The UE operates in a certain coverage enhancement (CE) level w.r.t. a certain cell e.g., with respect to cell1. The UE is configured to receive signals (e.g. paging, WUS, NPDCCH, NPDCCH, MPDSCH, PDSCH etc.) from at least cell1. The UE may further be configured to perform one or more signal measurements on cell1 and one or more additional cells, e.g., neighbor cells.

Example operational steps performed by a UE for adapting a PUR transmission when configured with a particular TA validation method include:
  Step 1: Obtaining information about the particular TA validation method to be used by the UE for validating a stored TA value in the UE, for use in performing an uplink transmission on PUR;
  Step 2: Obtaining information about the UE's measurement mode (e.g. normal measurement mode, relaxed measurement mode); and
  Step 3: Adapting the PUR transmission based on the obtained measurement-mode information. The immediately preceding steps are described in more detail below.

Step 1

In this first step, the UE obtains information about particular type of TA validation method UE is required to use for validating the received timing advance (TA) command Typically, the method is configured by the serving network node and therefore this type of method is known to the UE. Examples of methods that can be configured for TA validation are:
  Serving cell changes
  Time alignment timer (TAT) for IDLE mode
  Serving cell signal (e.g. RSRP) changes The TA validation method based on serving cell changes is described herein: The UE uses the preconfigured TA value when transmitting using the PUR resources in idle state provided that the serving cell has not changed since at least the reception of the TA command from that serving cell. Otherwise, the TA value from the old serving cell is deemed invalid upon the serving cell changing.

The TA validation method based on the TAT is described herein: The UE uses the preconfigured TA value—e.g., a TA value previously provided to the UE by the network and stored in the UE—when transmitting on PUR in the idle state, provided that the TAT is still running Otherwise (if the TAT has expired) then the TA becomes invalid. Here, it will be understood that the UE restarts a timer when it receives a TA value from the network and considers the TA value to be invalid (stale) upon expiration of the timer.

The TA validation method based on serving cell signal changes is described herein: This is based on a maximum allowed variation in signal strength ($\Delta SSmax$) in the serving cell. Examples of ASSmax are change in RSRP ($\Delta RSRPmax$), change in path loss ($\Delta PLmax$) etc. More specifically if the magnitude of the difference ($\Delta SS$) between a measured signal strength (SSm) (e.g. PL, RSRP, NRSRP etc) compared to reference signal strength (e.g. SSref) value in a cell estimated by the UE is within certain threshold ($\Delta SSmax$) then the UE assumes that the configured TA is valid. The SSref can be based on a configured or pre-defined value or it can be based on the measurement performed by the UE in the serving cell e.g. RSRP etc. The UE may obtain SSref at certain time instance, T1, e.g. when receiving a TA value from the serving cell. The UE may obtain SSm at another time instance, T2, e.g. before transmitting PUR in the serving cell.

Such configuration is typically provided to the UE as part of the PUR configuration which is received from CONNECTED mode.

Step 2

In this second step, the UE obtains information about its measurement mode, i.e., whether it is in normal measurement mode (ModeA) or relaxed measurement mode (ModeB). Typically, the selection measurement mode is done autonomously by the UE based on a set of criteria which can be predefined or configured. For category M1/M2 UE or NB-IoT UE, the criteria for entering the relaxed serving cell monitoring mode is as follows [TS 36.133 v15.6.0]:
  WUS has been configured in the serving NB-IoT cell using WUS-Config-NB-r15, and
  The serving cell measurement relaxation is signalled as n by the network using numDRX-CycleRelaxed-r15, and
  Serving cell S criteria is met with at least 2 dB margin.
  the relaxed monitoring criteria for neighbour cells in TS 36.304 v15.3.0 clause 5.2.4.12.1 is fulfilled . . .

When above criteria have been met, the UE may switch from ModeA to ModeB autonomously and vice versa when UE fails to meet the criteria. In one example, the UE may notify the serving network node about the measurement mode changes. In this embodiment, it is assumed that there are at least two measurement modes which are called ModeA (an example of a "normal measurement mode" at a UE) and ModeB (an example of a "relaxed measurement mode" at a UE) with following characteristics:
  The relaxed measurement mode is characterized by one or more relaxed measurement requirements with respect to reference-signal measurement requirements. Examples of relaxed measurement requirements are: measurement period longer than a reference measurement period, measurement accuracies include bias larger than a reference bias, measurement accuracies larger than a reference measurement accuracy etc. For example, with the relaxed measurement requirements a longer delay (e.g. larger than certain threshold) can be allowed for the UE to perform various operational tasks, e.g. radio link monitoring, handover, neighbor cell detection, cell re-selection etc. Relaxed measurement mode may also characterize coverage enhancement operation and support of lower mobility. As an example, the reference measurement requirements may correspond to those defined for normal measurement mode.

The normal measurement mode, on the other hand, is characterized by tighter measurement requirements with respect to reference measurement requirements. In some implementation the tighter measurement requirements may correspond to the reference measurement requirements e.g. those defined for normal measurement mode. Examples of tighter measurement requirements are: the measurement period is shorter than a reference measurement period, measurement accuracies include bias smaller than a reference bias etc. For example, with the tighter measurement requirements the UE can be required to perform various operational tasks in shorter times compared to relaxed measurement mode. Moreover, the normal measurement mode may also characterize good radio conditions, e.g. CE level 0, normal coverage, CEModeA, and in which case the UEs can be support higher velocities.

If the UE is in relaxed measurement mode (ModeB), UE may further obtain information about the relaxation. Example of such information are:
Relaxation factor, i.e. how much the UE is allowed to relax the measurements in comparison to a reference mode. For example, factor N would mean that UE is allowed to measure every Nth DRX cycle instead of every DRX cycle, and specific examples of N is 4, 6, 8 etc.
Duration of relaxation, i.e. for how long the UE shall stay in relaxed measurement mode when the criteria is met. E.g. for time duration T0.

Since the actual switching of measurement mode is performed by the UE, this type of measurement UE is currently at or is going to be at is known to the UE.

Step 3

In this third step, the UE uses the obtained information in previous steps for adapting the PUR transmission when configured with a particular type of TA validation method.

In one aspect of the embodiment, if the obtained information indicates that the UE is configured with the particular TA validation method (e.g. method using serving cell RSRP changes to validate the TA), and the obtained information further indicates that the UE is in relaxed measurement mode, then the UE shall take any of the following actions:
Abandon the intended PUR transmission
Declare the outcome of the TA validation method as failure regardless of whether the relative measurement change is within the signaled threshold
Notify the serving network node about its inability to perform TA validation using the configured TA validation method.
Switch to CONNECTED mode and update/obtain a new TA value
Fallback to legacy procedures to carry out the intended data transmission, examples of such procures include transmission using EDT, transmission in CONNECTED state
Suspend or delay the PUR transmissions for at least a period of time or until the UE reverts to the normal measurement mode.

In another aspect of the embodiment, if the obtained information indicates that the UE is configured with the particular TA validation method (e.g. method using serving cell RSRP changes to validate TA), and the obtained information further indicates the UE is in relaxed measurement mode, then the UE further checks the information about the relaxation factor for adapting the PUR transmissions. The UE compares the relaxation factor (N), which can be signaled by the network node or pre-defined, with a certain threshold (T). Based on this comparison the UE decides whether to allow or disallow the PUR transmission regardless of TA validation outcome.

In one example, it is assumed that N=8 and T=4, and, because N>T, the UE declares the TA validation method using serving cell RSRP as failure because UE is allowed (very likely) to measure every 8th DRX cycle and therefore the measurements used for validating the TA are likely to be quite old and therefore not reliable for validating the TA value stored in the UE. The UE may further take any of the actions described above, e.g., abandoning or delaying the PUR transmission.

In another example, it is assumed that N=4 and T=4, and, because N≤T, the UE performs the PUR transmission based on the outcome of TA validation method using serving cell RSRP change because the UE is required to measure quite frequently and therefore the latest available measurements used in the validation process are likely to be valid.

Another contemplated embodiment involves a method of selecting a TA validation method to be used by a UE, with a network node performing this network-side method. The steps involved in this further network node embodiment can be summarized as follows:
Step 1: Obtaining information about the UE measurement mode (e.g. normal measurement mode, relaxed measurement mode).
Step 2: Selecting a TA validation method based on the obtained information about the UE measurement mode.
Step 3: Configuring the UE with the selected TA validation method for PUR operation.

The steps are described in more detail below.

Step 1

The steps involved in this first step are similar to those described in step 2 of the earlier-detailed method of operation for a network node.

Step 2

In this step, the network node selects at least one out of multiple TA validation method for PUR operation. In the selection process, the network node shall exclude any TA validation method that relies on RRM measurement (e.g. absolute RSRP measurement, relative RSRP measurement, absolute RSRQ measurement etc.).

In one specific example, the network node shall not select the TA validation method that is based on signal measurements (e.g. one based on serving cell RSRP changes) when the obtained information in previous step indicates that UE is in relaxed measurement mode (or any relaxed mode with respect to a reference mode). When the UE is in relaxed measurement mode, the UE may not perform measurement frequently and therefore the measurements used for validating the received TA are likely to be out dated and can therefore result in incorrect evaluation result. Network node may instead select any of the other TA validation methods which do not require signal measurements. Examples of such methods are:

Configuring of the TAT timer associated with received TA
Configure TA to be always valid within a cell
Serving cell changes e.g. TA received from a serving cell becomes invalid after that serving cell is changed otherwise the TA remains valid.
Validate the received TA based on any other criteria which do not depend on RRM measurements.

Step 3

In this third step, the network node configures the UE with the selected TA validation method for PUR operation. Such configuration can be made using dedicated signaling in RRC_CONNECTED state or using any broadcast signaling.

In yet another aspect of this network-node embodiment, the UE can be configured by the network node with a set of TA validation methods, which are applicable for the UE to validate TA when the UE is in relaxed monitoring mode. Examples of the set of TA validation methods are the same as described above in step 2 of section 5.3. The UE upon entering into the relaxed measurement mode may autonomously select one of the TA validation method in the pre-configured set of the TA validation methods and used the selected method for validating the TA for PUR transmission. When in relaxed measurement mode the UE shall not apply any method other than those in the pre-configured set of the TA validation methods.

Another contemplated method of operation at a UE involves the UE selecting or adapting its measurement mode. The steps involved in this method of method variation can be summarized for the UE as follows:

Step 1: Obtaining information about a particular TA validation method for PUR,
Step 2: Selecting a measurement mode based on the obtained information about type of TA validation method,
Step 3: Using the selected measurement mode for performing one or more measurements.
The steps are described in more detail below.

Step 1

In this first step, the UE obtains information about particular type of TA validation method the UE is required to use for validating the received timing advance (TA) command. Typically, the method is configured by the serving network node and therefore this type of method is known to the UE. Examples of methods that can be configured for TA validation are:

Serving cell changes
Time alignment timer (TAT) for IDLE mode
Serving cell RSRP changes Such configuration is typically provided to the UE as part of the PUR configuration which is received from the network while the UE is in the CONNECTED mode.

Step 2

In this second step, the UE selects at least one out of multiple measurement modes based on the type of TA validation method configured by the UE in previous step (in step 1).

If the UE has been configured with a particular TA validation method for PUR transmission using serving cell measurement changes (e.g. RSRP, RSRQ, Es/IoT, SINR, SNR, etc.) then the UE remains in measurement mode A (also called normal measurement mode) regardless of whether or not the criteria for entering the measurement mode B (also called relaxed measurement mode) are fulfilled. In other words, the UE is not allowed to enter the relaxed measurement mode if it has been configured with a particular type of TA validation method.

For a UE that needs to validate the preconfigured or received TA value when the PUR transmission opportunity arrives, firstly the UE needs to determine the magnitude of the serving cell RSRP changes (e.g. ARSRP) with respect to reference value and ensure that transmissions take place only when the magnitude of change is less than the signaled RSRP threshold from the involved radio network node (e.g., an eNodeB), i.e., ARSRP≤Amax-RSRP. Accounting for the UE power consumption, the UE is not expected to perform additional RRM measurement for PUR purposes. Instead, the latest available measurements in the UE are used to derive the relative change, ARSRP, see FIG. 6. In example A, the UE uses the latest RRM measurement (2nd measurement) associated with the PUR transmission opportunity and the RRM measurement (1st measurement) closest to the time when TA was received. In example B, it is assumed the measurement occasions and the PUR transmission opportunity are aligned.

Figure 6:
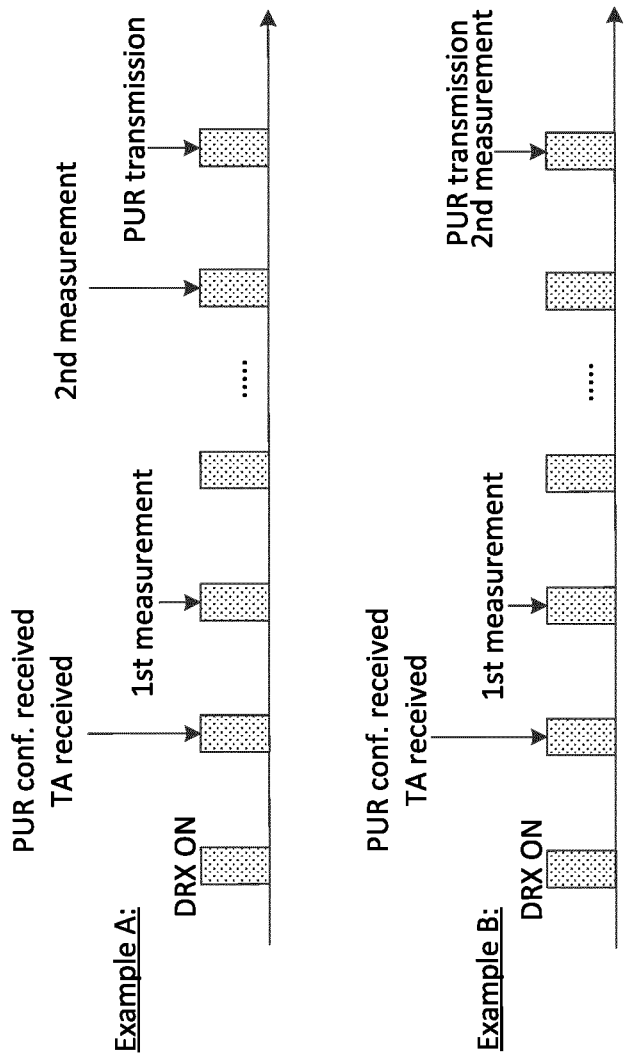
FIG. 6 is a diagram of example radio-signal measurements made by a wireless device.

As an observation regarding FIG. 6, note that the UE is not expected to perform additional serving cell measurement for TA validation purpose.

Figure 7:
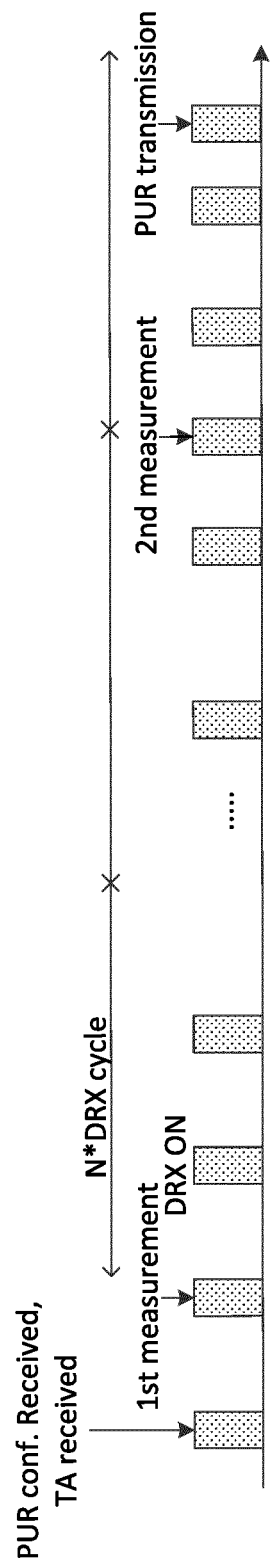
FIG. 7 is another diagram of example radio-signal measurements, in the context of DRX operation by a wireless device.

The same UE may support relaxed serving cell monitoring. Relaxed serving cell monitoring allows the UE to measure every Nth DRX cycles instead of every DRX cycle as in mode A, and N is a singled parameter indicating the relaxation factor. It is important to note that relaxed serving cell monitoring may have an adverse impact on the reliability of TA validation method using serving cell RSRP change method since the latest measurements used for TA validation can be outdated, may not be tightly associated with the PUR configuration nor PUR transmission occasions, and may lead to incorrect TA validation result, see FIG. 7.

Hence, the UE configured with TA validation method using serving cell RSRP change method should not be allowed to enter the mode B, i.e., the relaxed serving cell monitoring mode regardless of whether other relaxed monitoring criteria is met. Instead the UE shall stay in mode A which is characterized by tighter measurement requirements in comparison to the mode B requirements.

In some implementation the tighter measurement requirements may correspond to the reference measurement requirements e.g. those defined for normal measurement mode. Examples of tighter measurement requirements are: the measurement period is shorter than a reference measurement period, measurement accuracies include bias smaller than a reference bias etc. For example, with the tighter measurement requirements the UE can be required to perform various operational tasks in shorter times compared to relaxed measurement mode.

If UE has NOT been configured with the particular type of TA validation method (e.g. method based on serving cell RRM measurement changes) then the UE is allowed to enter the measurement mode B (ModeB) based on the involved criteria. For example, with respect to the relevant 3GGPP Technical Specifications, use of the relaxed measurement mode may be triggered or exercised based on the following criteria:

WUS has been configured in the serving NB-IoT cell using WUS-Config-NB-r15, and

The serving cell measurement relaxation is signalled as n by the network using numDRX-CycleRelaxed-r15, and Serving cell S criteria is met with at least 2 dB margin. the relaxed monitoring criteria for neighbour cells in TS 36.304 v15.3.0 clause 5.2.4.12.1 is fulfilled . . .
See 3GPP TS 36.331 v15.6.0, 3GPP TS 36.304 v15.3.0, and 3GPP TS 36.133 v15.6.0.

The mode B is characterized by one or more relaxed measurement requirements with respect to reference measurement requirements. Examples of relaxed measurement requirements are: measurement period longer than a reference measurement period, measurement accuracies include bias larger than a reference bias, measurement accuracies larger than a reference measurement accuracy etc. For example, with the relaxed measurement requirements a longer delay (e.g. larger than certain threshold) can be allowed for the UE to perform various operational tasks, e.g. radio link monitoring, handover, neighbor cell detection, cell re-selection etc. Relaxed measurement mode may also characterize coverage enhancement operation and support of lower mobility. As an example, the reference measurement requirements may correspond to those defined for normal measurement mode.

In yet another aspect of this UE embodiment, UE may enter the relaxed measurement mode even if the UE is configured with a particular type of TA validation method but with a specific set of one or more relaxation configuration parameters. As an example, the UE may limit the relaxation factor (N) when it is operating under relaxed measurement mode while it is configured with a particular TA validation method. Limiting the value of N (e.g. N<T) will require the UE to measure rather frequently compared to having a large value of N, and this will in turn improve the TA validation method because the used measurements are newer and likely to be valid. In one specific example, N=4 and T=6. In this case, UE will be allowed to enter the relaxed measurement mode only when N<=T and otherwise it shall not enter the relaxed measurement mode.

Step 3

In this third step, the UE uses the selected measurement mode (ModeA or ModeB) to perform one or more measurements. The UE may further use the results of the performed measurements for carrying out one or more operational tasks. Examples of measurements are NRSRP, NRSRQ, SINR, path loss etc. Examples of such tasks are power control, reporting results to network node, random access procedure etc.

Figure 8:
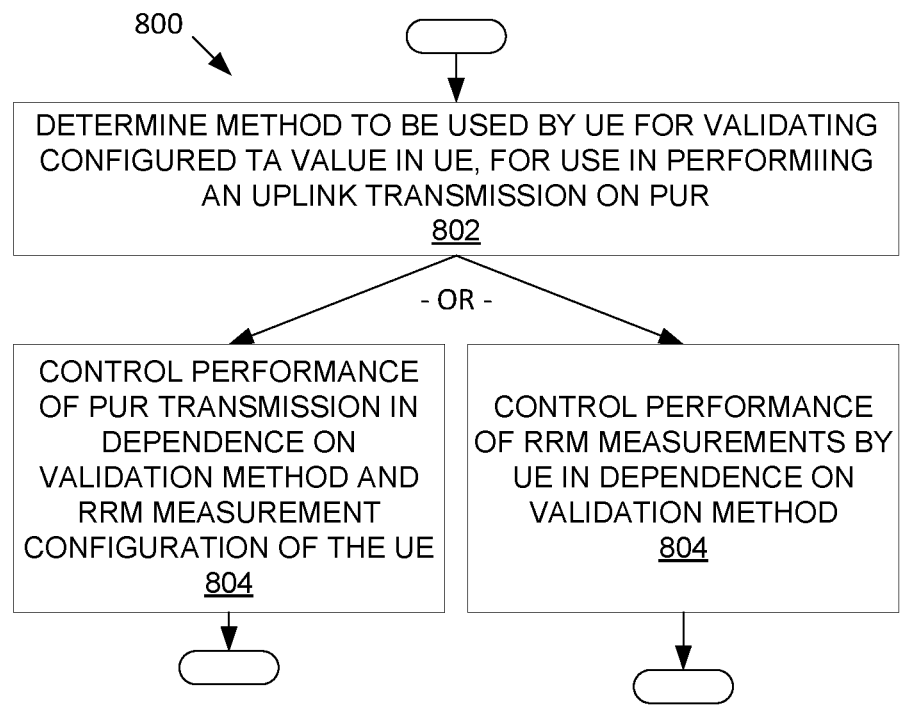
FIG. 8 is a logic flow diagram of another example embodiment of method of operation by a wireless device.

As a further example, FIG. 8 depicts a method 800 in accordance with particular embodiments. The method 800 includes a UE determining (Block 802) the method to be used by the UE for validating a configured TA value in the UE, for use in performing an uplink transmission on PUR. That is, at an earlier time, the UE received a TA value from an RNN and the UE must later determine whether that configured TA value is still valid for the UE to use in controlling its uplink transmission timing, for performing an uplink transmission towards the RNN. The operations in 802 therefore can be understood as the UE determining by what method it is to perform that later validation of the configured TA value. In an example, embodiment, the UE "determines" the validation method based on receiving/processing configuration signaling from the RNN, where that signaling sets/indicates the validation method to be used by the UE.

Once the UE knows that the validation method it is supposed to use for TA validation depends on RRM measurements made by the UE, the UE has several choices. As seen in Block W104, the UE can exercise its normal behavior regarding making RRM measurements and then control its performance of a PUR transmission in dependence on whether its RRM measurements are reliable enough for use in TA validation. That is, the UE can enter a relaxed measurement mode or allow whatever degree of measurement relaxation it is designed to allow for given conditions or at-large operating scenarios, without concerning itself whether the resulting RRM measurements will be reliable enough for use in TA validation.

Then, when the UE needs or decides to perform a PUR transmission it is faced with the possibility of having RRM measurements that are not reliable enough for TA validation. Of course, the UE may be operating in a normal or more rigorous measurement mode that yields sufficiently reliable RRM measurements and, in that case, it uses its most current measurement(s) in the configured TA validation method. However, if the UE has been performing RRM measurements in a manner that leaves its most current measurement(s) too unreliable (e.g., too old, insufficiently accurate), it controls its performance of the PUR transmission accordingly. For example, the UE may skip/avoid performing the transmission. Of course, the UE may use another type of transmission, e.g., by making an EDT transmission or reconnecting to the RNN. In another example, the UE obtains a new TA value from the involved RNN before performing the PUR transmission.

As another choice, Block 804 shows that the UE may control its performance of RRM measurements (or, at least control any relevant subset of such measurements), to ensure that the UE has measurements that are considered to be sufficiently reliable, at any later time at which the UE decides to or needs to perform an uplink transmission on the involved PUR.

Put simply, FIG. 8 illustrate that, upon determining that the method to be used by the UE in validating a stored TA value for use in performing an uplink transmission on PUR associated with that stored TA value depends on the UE's RRM measurements, the UE has two choices: (1) use whatever RRM measurement configuration is otherwise applicable to the UE's at-large operating conditions and handle the consequences at the time of the contemplated PUR transmission if that RRM configuration does not provide sufficiently reliable measurements; or (2) control its RRM configuration (e.g., override its normal control of RRM measurements), to ensure that the UE uses an RRM measurement configuration that provides RRM measurements of sufficient reliability.

"Handling the consequences" of having unreliable RRM measurements comprises, for example, the UE skipping the PUR transmission, getting a new TA value before performing the PUR transmission, etc. Again, skipping the PUR transmission does not mean, necessarily, that the UE does not perform another type of uplink transmission.

Figure 9:
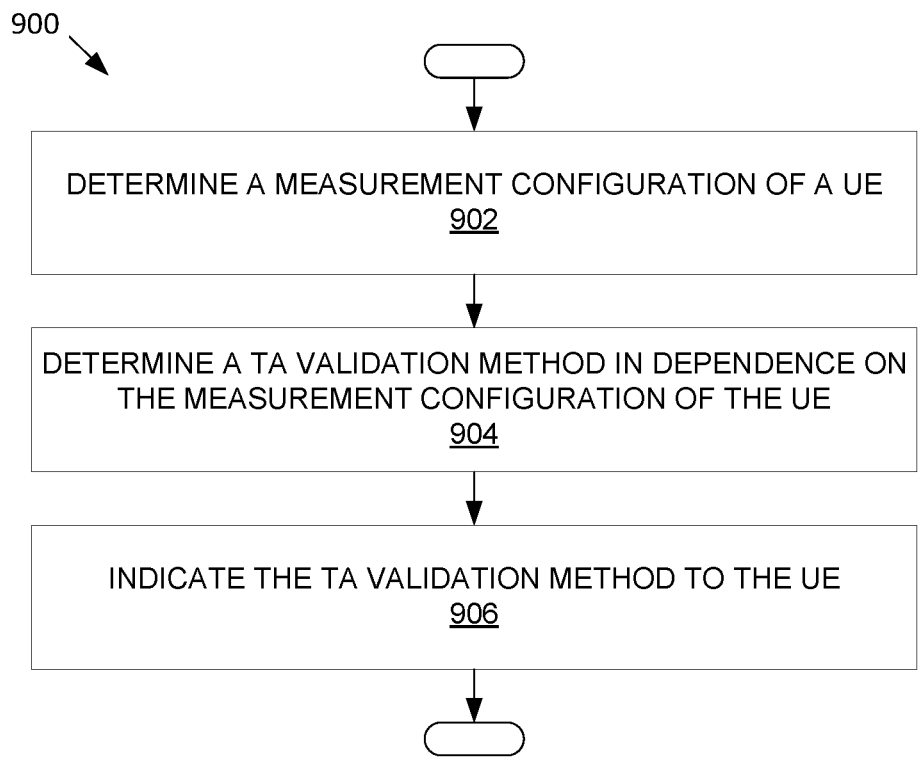
FIG. 9 is a logic flow diagram of another example embodiment of a method of operation by a radio network node.

FIG. 9 depicts a method 900 in accordance with other particular embodiments. The method 900 includes a network node, such as an eNB in LTE or a gNB in 5G/NR, determining a UE's RRM measurement configuration—e.g., determining whether the UE is configured to operate in a normal RRM measurement mode or in a relaxed RRM measurement mode, or determining the degree or extent of relaxation in use at the UE (Block 902). The network node may determine the measurement configuration of the UE based on receiving an indication directly or indirectly from the UE, or it may infer the measurement configuration from other information—e.g., the DRX/non-DRX configuration of the UE.

At Block 904, the network node determines a TA validation method in dependence on the UE's measurement configuration. For example, assume that there are one or more TA validation methods that do not rely on RRM measurements by the UE and one or more TA validation methods that rely on RRM measurements by the UE. As such, in one implementation of the illustrated method, the network node is configured to select one of the TA validation methods that do not depend on the UE's RRM measurements, responsive to determining that the UE's RRM measurement configuration is not suitable for the TA validation method(s) that do depend on RRM measurements.

In one example, the network node is programmed or otherwise configured to consider a certain measurement mode—e.g., a defined relaxed measurement mode of RRM measurements by the UE—to be unsuitable. Or the network node may be configured to consider a certain degree or extent of measurement relaxation as corresponding to a threshold at which the RRM measurements at the UE are unsuitable for use in TA validation by the UE. For example, the network node may consider the periodicity or accuracy of RRM measurements defined for the RRM measurement configuration of the UE, e.g., assess whether the UE obtains measurements frequently enough or with enough accuracy to allow the UE to use those measurements for TA validation.

Once the network node determines the TA validation method to be used by the UE, it indicates the selected method to the UE (Block 906). If the network node is a radio network node connected to the UE, it sends the indication directly to the UE. If the network node is in the core network or not otherwise anchoring the air interface with the UE, the indication is sent indirectly, e.g., through one or more other network nodes.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 10:
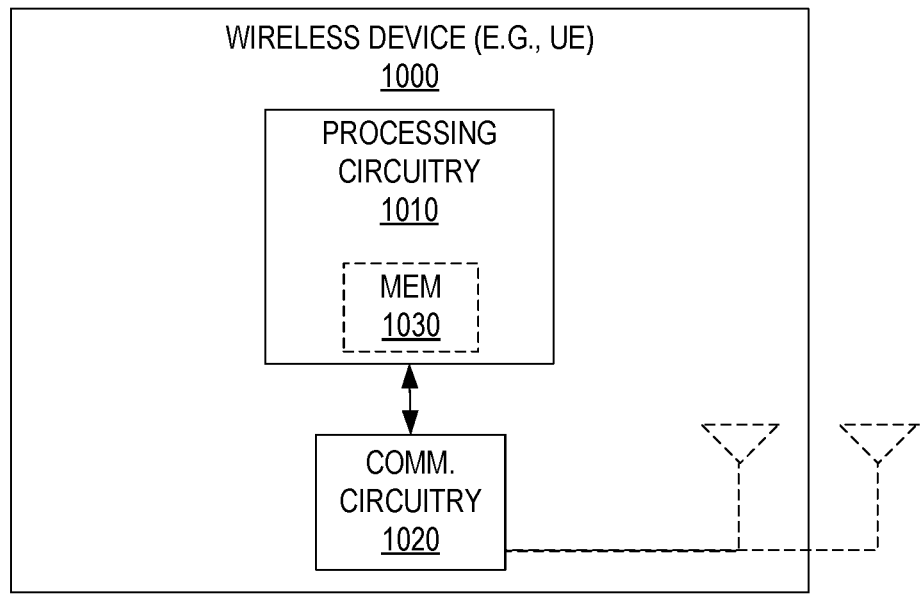
FIG. 10 is a block diagram of another example embodiment of a wireless device.

FIG. 10 for example illustrates a wireless device 1000 as implemented in accordance with one or more embodiments. The wireless device 1000 may be the earlier-described wireless device 12 or another wireless communication apparatus. As shown, the wireless device 1000 includes processing circuitry 1010 and communication circuitry 1020. The communication circuitry 1020 (e.g., radio circuitry) is configured to transmit and/or receive information to and/or from one or more other nodes, e.g., via any communication technology. Such communication may occur via one or more antennas that are either internal or external to the wireless device 1000. The processing circuitry 1010 is configured to perform processing described above, such as by executing instructions stored in memory 1030. The processing circuitry 1010 in this regard may implement certain functional means, units, or modules.

Figure 11:
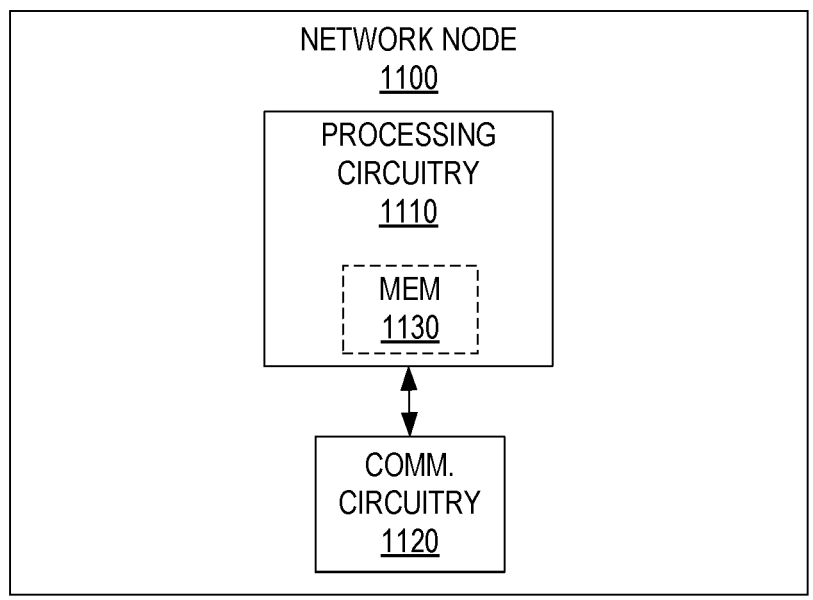
FIG. 11 is a block diagram of another example embodiment of a radio network node.

FIG. 11 illustrates a network node 1100 as implemented in accordance with one or more embodiments. The network node 1100 may be the earlier-detailed RNN 22 or any other type of network node. As shown, the network node 1100 includes processing circuitry 1110 and communication circuitry 1120. The communication circuitry 1120 is configured to transmit and/or receive information to and/or from one or more other nodes, e.g., via any communication technology. The processing circuitry 1110 is configured to perform processing described above, such as by executing instructions stored in memory 1130. The processing circuitry 1110 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 12:
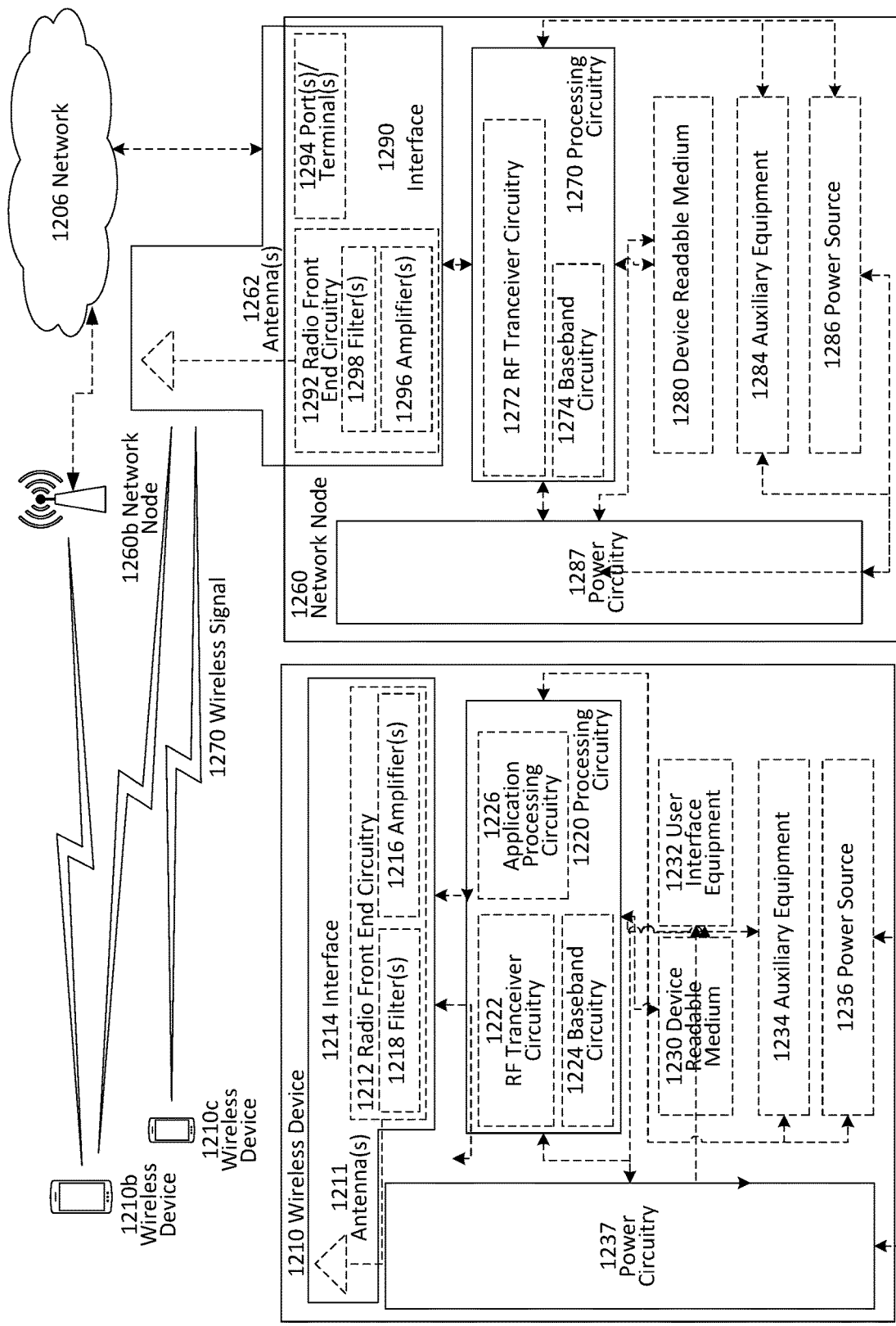
FIG. 12 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 12. The illustrated network comprises a more detailed depiction of the earlier-described network 10, for example, or comprises yet another network according to further embodiments. For simplicity, the wireless network of FIG. 12 only depicts network 1206, network nodes 1260 and 1260*b*, and wireless devices 1210, 1210*b*, and 1210*c*. In practice, a wireless network may further include any additional elements suitable to support communication between wireless devices or between a wireless device and another communication device, such as a landline telephone, a service provider, or any other network node or end device. Of the illustrated components, network node 1260 and wireless device 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and wireless device 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units.

In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260 but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or wireless devices 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or wireless devices via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. The wireless device 1210 may include multiple sets of one or more of the illustrated components for different wireless technologies supported by wireless device 1210, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within wireless device 1210.

Antenna 1211 may include one or more antennas or antenna arrays, configured to send and/or receive wireless signals, and is connected to interface 1214. In certain alternative embodiments, antenna 1211 may be separate from wireless device 1210 and be connectable to wireless device 1210 through an interface or port. Antenna 1211, interface 1214, and/or processing circuitry 1220 may be configured to perform any receiving or transmitting operations described herein as being performed by a wireless device. Any information, data and/or signals may be received from a network node and/or another wireless device. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220 and is configured to condition signals communicated between antenna 1211 and processing circuitry 1220. Radio front end circuitry 1212 may be coupled to or a part of antenna 1211. In some embodiments, wireless device 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or wireless devices via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 1210 components, such as device readable medium 1230, wireless device 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of wireless device 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a wireless device may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner In any of those particular embodiments, whether executing instructions stored on a device readable storage medium or not, processing circuitry 1220 can be configured to perform the described functionality. The benefits provided by such functionality are not limited to processing circuitry 1220 alone or to other components of wireless device 1210, but are enjoyed by wireless device 1210 as a whole, and/or by end users and the wireless network generally.

Processing circuitry 1220 may be configured to perform any determining, calculating, or similar operations (e.g., certain obtaining operations) described herein as being performed by a wireless device. These operations, as performed by processing circuitry 1220, may include processing information obtained by processing circuitry 1220 by, for example, converting the obtained information into other information, comparing the obtained information or converted information to information stored by wireless device 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with wireless device 1210. Such interaction may be of many forms, such as visual, audial, tactile, etc. User interface equipment 1232 may be operable to produce output to the user and to allow the user to provide input to wireless device 1210. The type of interaction may vary depending on the type of user interface equipment 1232 installed in wireless device 1210. For example, if wireless device 1210 is a smart phone, the interaction may be via a touch screen; if wireless device 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into wireless device 1210 and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from wireless device 1210, and to allow processing circuitry 1220 to output information from wireless device 1210. User interface equipment 1232 may include, for example, a speaker, a display, vibrating circuitry, a USB port, a headphone interface, or other output circuitry. Using one or more input and output interfaces, devices, and circuits, of user interface equipment 1232, wireless device 1210 may communicate with end users and/or the wireless network and allow them to benefit from the functionality described herein.

Auxiliary equipment 1234 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. The wireless device 1210 may further comprise power circuitry 1237 for delivering power from power source 1236 to the various parts of wireless device 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case wireless device 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of wireless device 1210 to which power is supplied.

Figure 13:
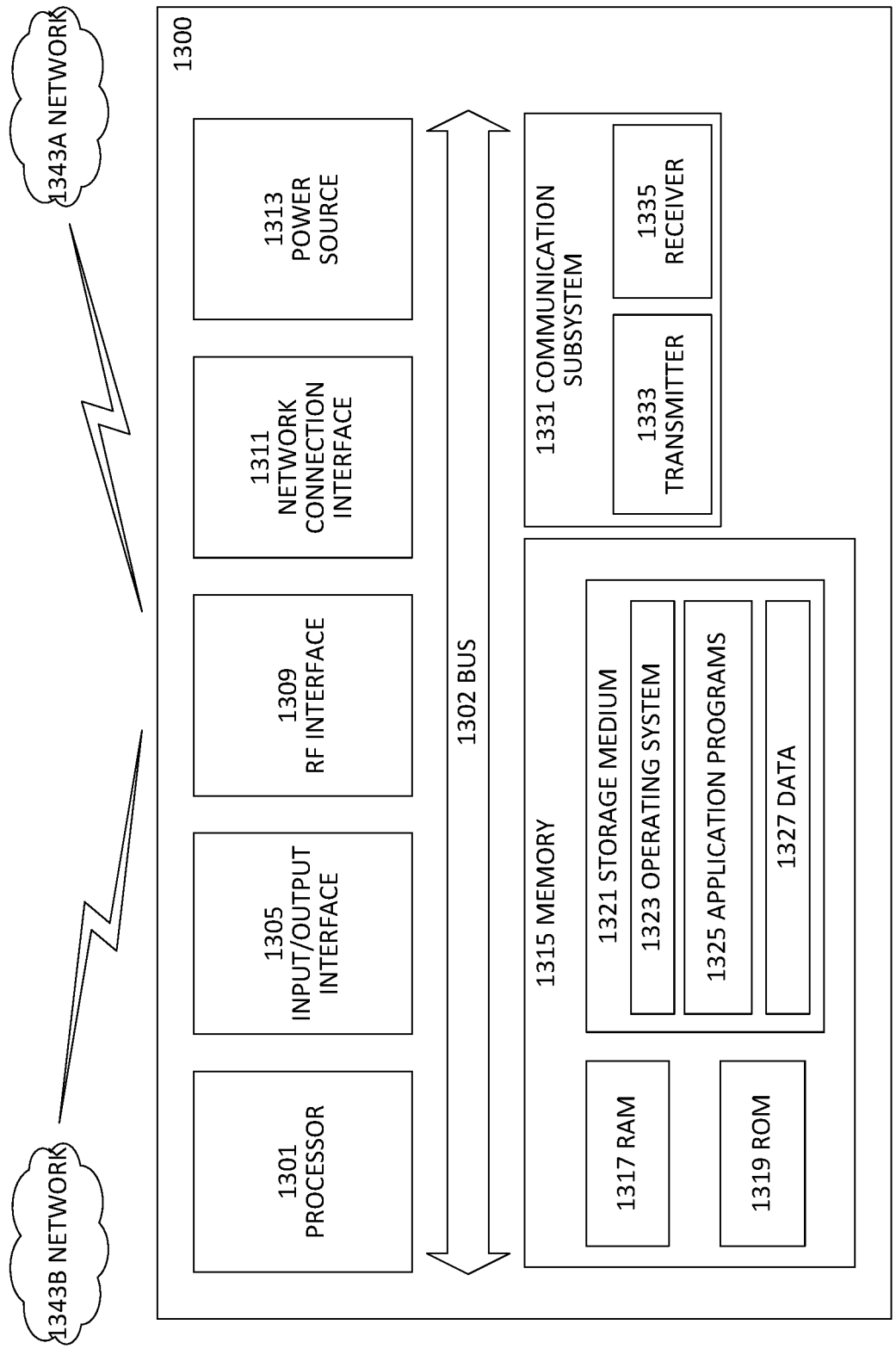
FIG. 13 is a block diagram of a user equipment according to some embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 13200 may be any UE identified by the 3$^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 13 is a UE, the components discussed herein are equally applicable to a wireless device, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer. In the depicted embodiment, input/output interface 1305 may be configured to provide a communication interface to an input device, output device, or input and output device. UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1309 may be configured to provide a communication interface to RF components such as a transmitter, a receiver, and an antenna. Network connection interface 1311 may be configured to provide a communication interface to network 1343a. Network 1343a may encompass wired and/or wireless networks such as a local-area network (LAN), a wide-area network (WAN), a computer network, a wireless network, a telecommunications network, another like network or any combination thereof. For example, network 1343a may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311 may implement receiver and transmitter functionality appropriate to the communication network links (e.g., optical, electrical, and the like). The transmitter and receiver functions may share circuit components, software or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343b using communication subsystem 1331. Network 1343a and network 1343b may be the same network or networks or different network or networks. Communication subsystem 1331 may be configured to include one or more transceivers used to communicate with network 1343b. For example, communication subsystem 1331 may be configured to include one or more transceivers used to communicate with one or more remote transceivers of another device capable of wireless communication such as another wireless device, UE, or base station of a radio access network (RAN) according to one or more communication protocols, such as IEEE 802.13, CDMA, WCDMA, GSM, LTE, UTRAN, WiMax, or the like. Each transceiver may include transmitter 1333 and/or receiver 1335 to implement transmitter or receiver functionality, respectively, appropriate to the RAN links (e.g., frequency allocations and the like). Further, transmitter 1333 and receiver 1335 of each transceiver may share circuit components, software or firmware, or alternatively may be implemented separately.

In the illustrated embodiment, the communication functions of communication subsystem 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343b may encompass wired and/or wireless networks such as a local-area network (LAN), a wide-area network (WAN), a computer network, a wireless network, a telecommunications network, another like network or any combination thereof. For example, network 1343b may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Figure 14:
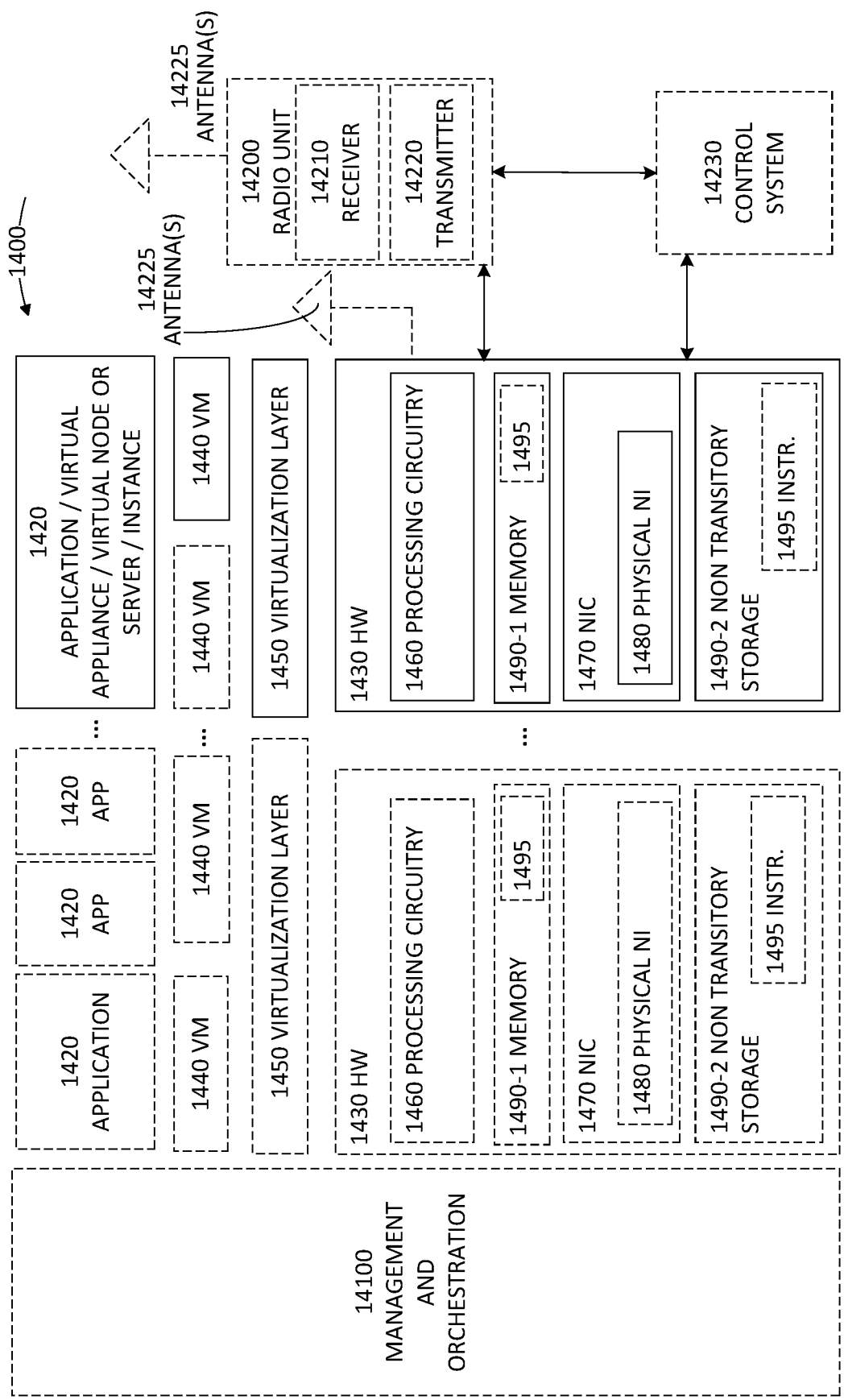
FIG. 14 is a block diagram of a virtualization environment according to some embodiments.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g. such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signalling can be effected with the use of control system 14230 which may alternatively be used for communication between the hardware nodes 1430 and radio units 14200.

Figure 15:
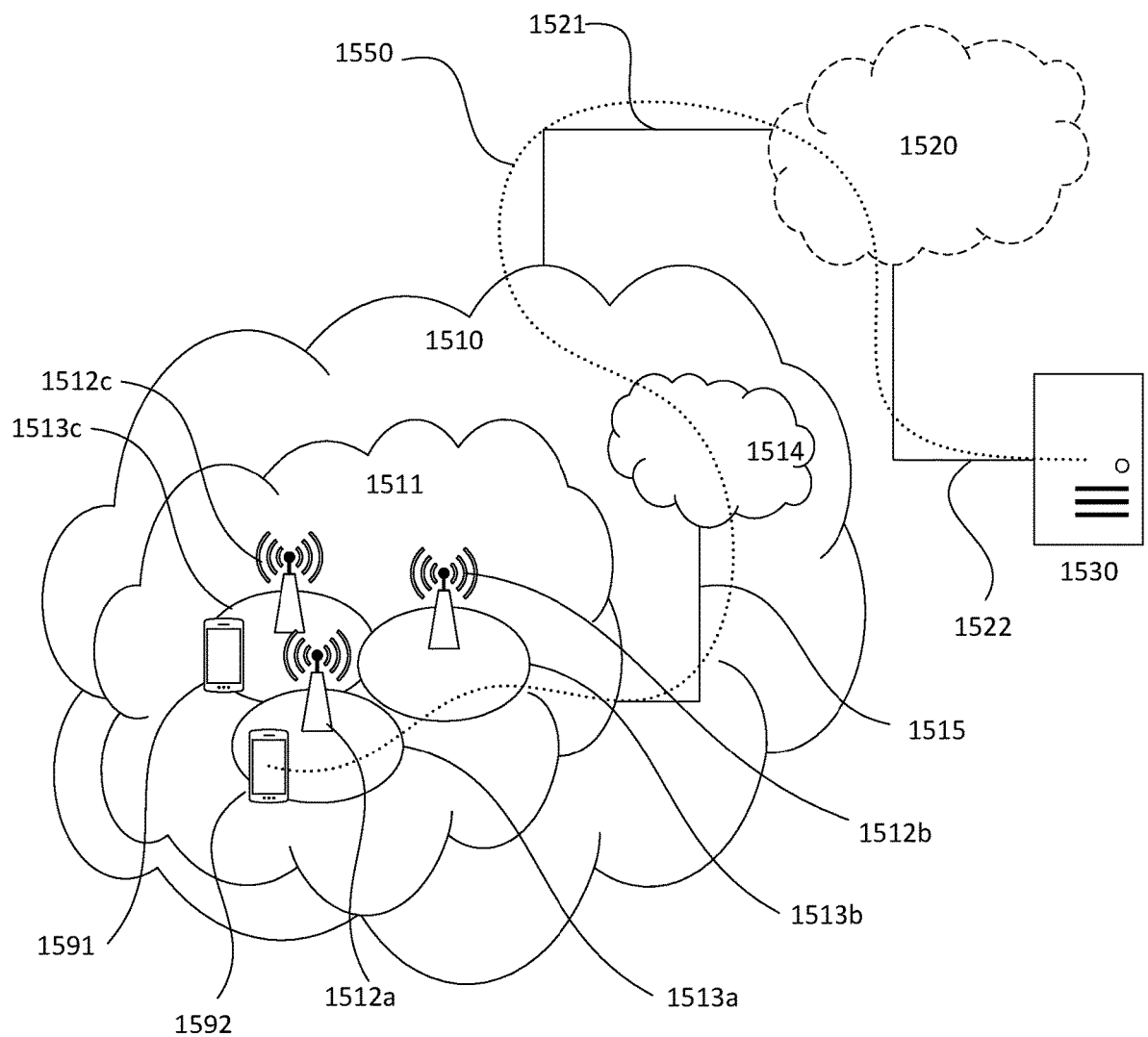
FIG. 15 is a block diagram of a communication network with a host computer according to some embodiments.

FIG. 15 illustrates a telecommunication network connected via an intermediate network to a host computer in accordance with some embodiments. In particular, with reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512a, 1512b, 1512c, such as NBs, eNBs, gNBs or other types of wireless access points, each defining a corresponding coverage area 1513a, 1513b, 1513c. Each base station 1512a, 1512b, 1512c is connectable to core network 1514 over a wired or wireless connection 1515. A first UE 1591 located in coverage area 1513c is configured to wirelessly connect to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area or where a sole UE is connecting to the corresponding base station 1512.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private or hosted network; intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Figure 16:
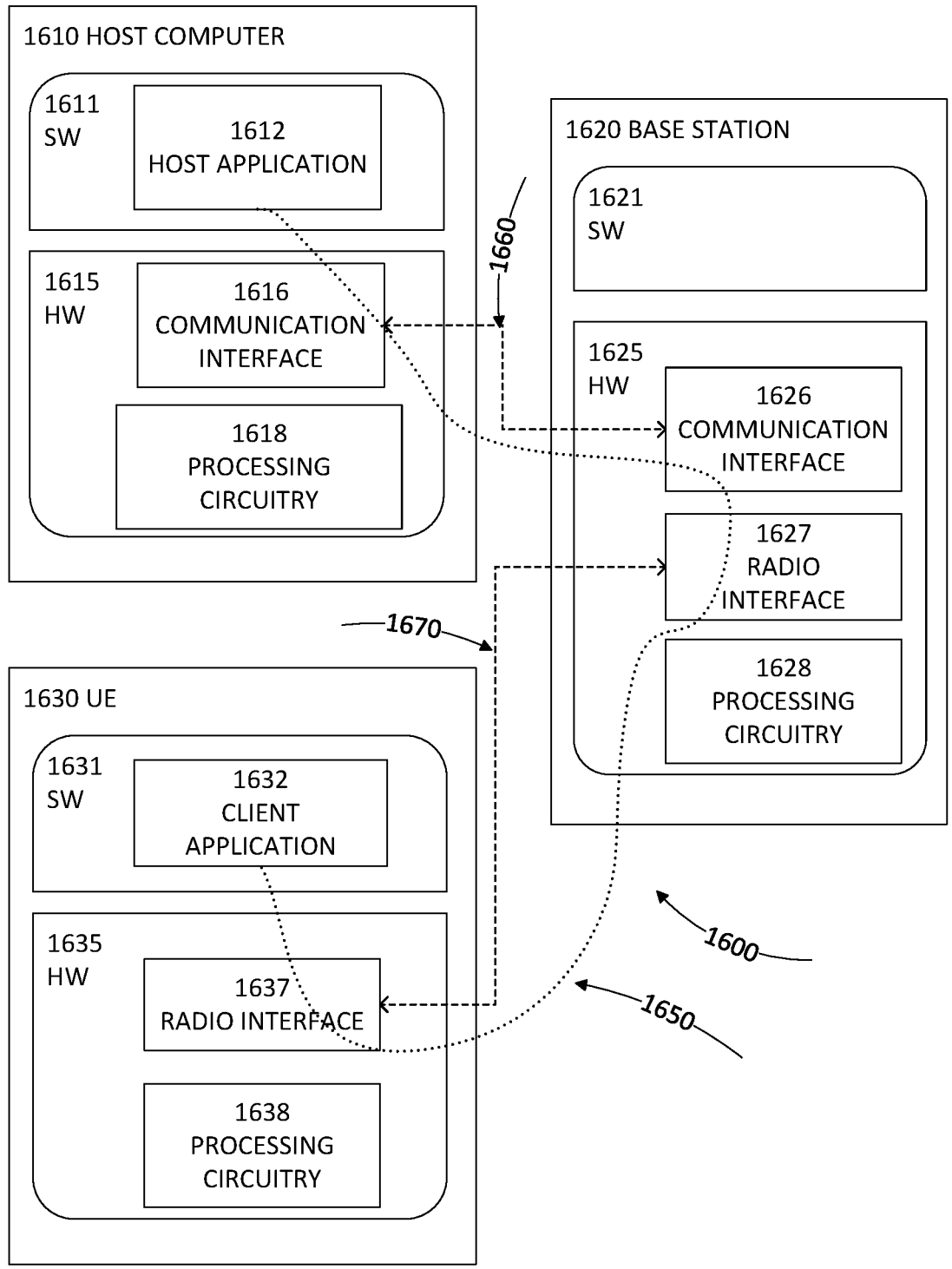
FIG. 16 is a block diagram of a host computer according to some embodiments.

Example implementations, in accordance with an embodiment, of the UE, base station and host computer discussed in the preceding paragraphs will now be described with reference to FIG. 16. FIG. 16 illustrates host computer communicating via a base station with a user equipment over a partially wireless connection in accordance with some embodiments In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct or it may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 further includes UE 1630 already referred to. Its hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

It is noted that host computer 1610, base station 1620 and UE 1630 illustrated in FIG. 16 may be similar or identical to host computer 1530, one of base stations 1512*a*, 1512*b*, 1512*c* and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the teachings of these embodiments may improve the reliability of PUR transmissions by a UE and thereby provide benefits such as increasing the reliability of communications between the UE and the host computer 1610. Such improvements may reduce latency, e.g., by avoiding having to skip PUR transmissions or obtain new TA values for performing PUR transmission.

A measurement procedure may be provided for the purpose of monitoring data rate, latency and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signaling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

Figure 17:
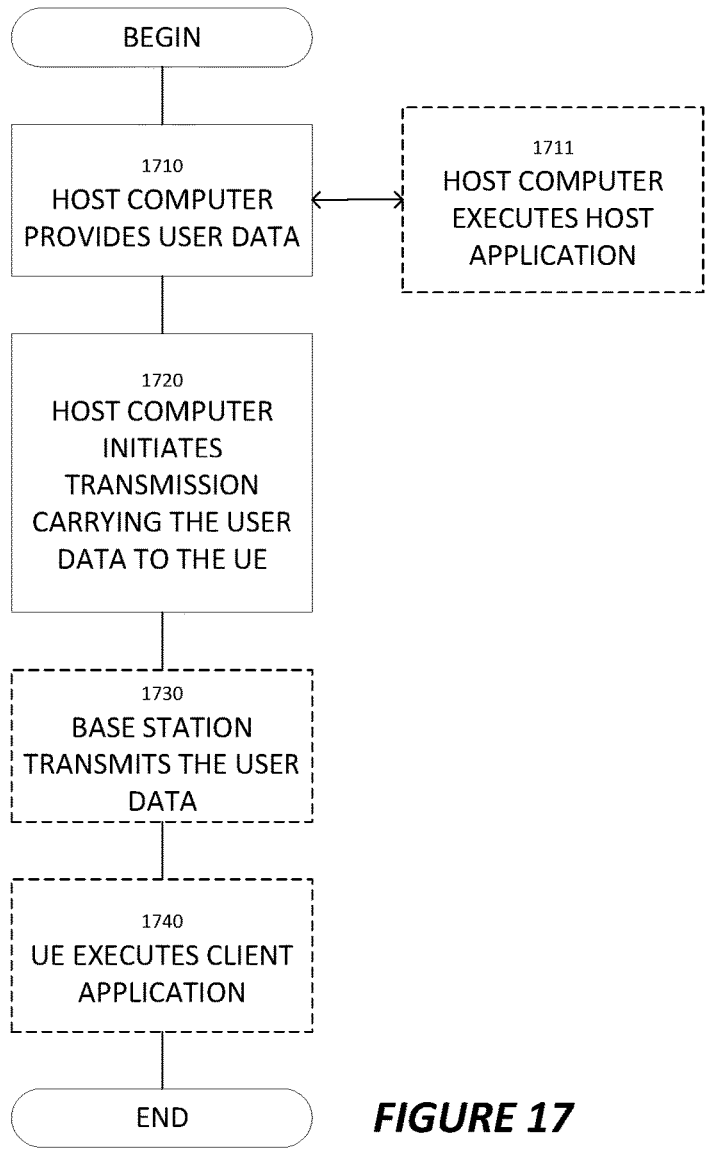
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1710, the host computer provides user data. In substep 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

Figure 18:
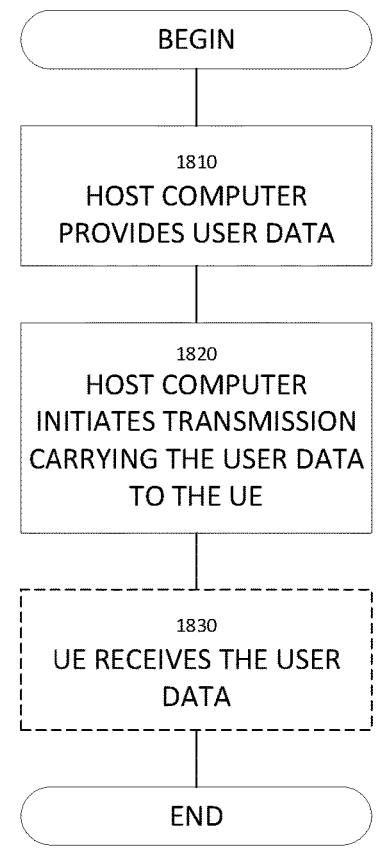
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

Figure 19:
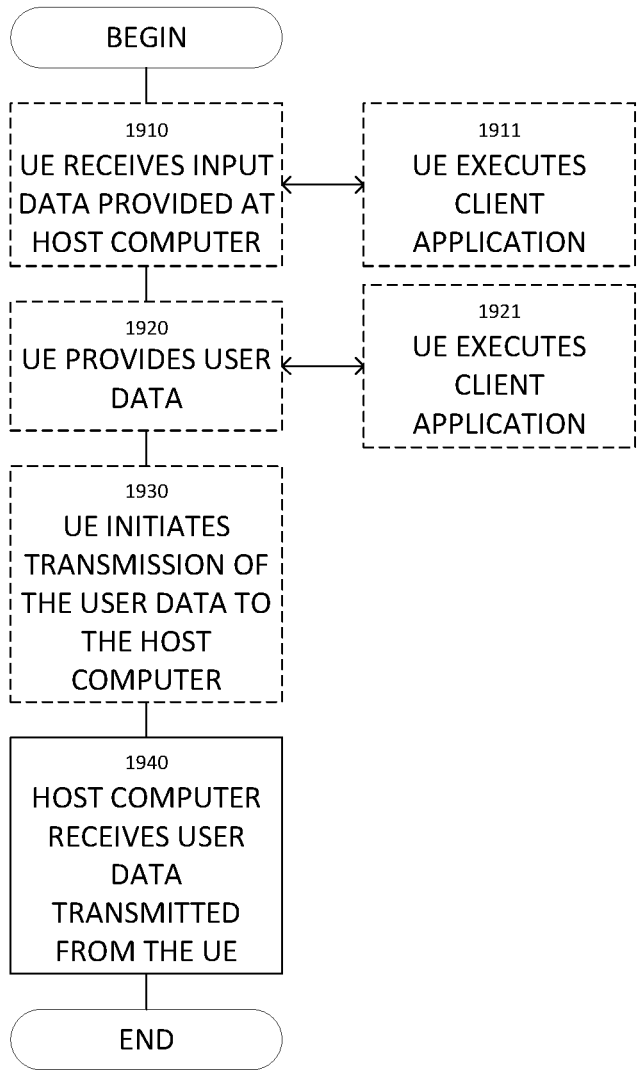
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally, or alternatively, in step 1920, the UE provides user data. In substep 1921 (which may be optional) of step 1920, the UE provides the user data by executing a client application. In substep 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in substep 1930 (which may be optional), transmission of the user data to the host computer. In step 1940 of the method, the host computer receives the user data transmitted from the UE, in accordance with the teachings of the embodiments described throughout this disclosure.

Figure 20:
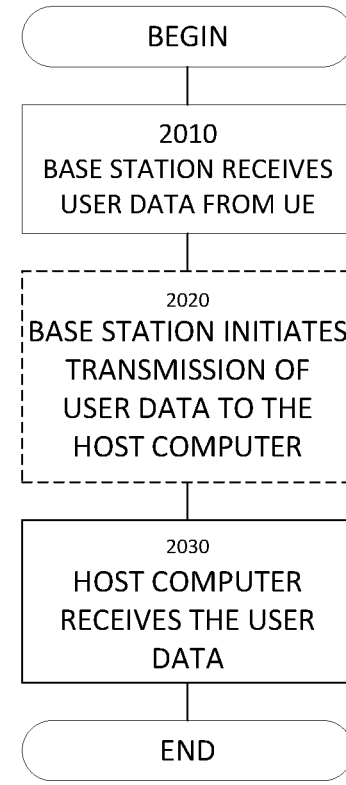
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Figure 21:
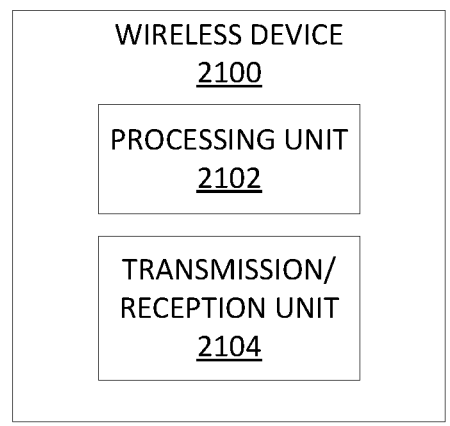
FIG. 21 is a block diagram of one embodiment of a virtualized wireless device.

FIG. 21 depicts a wireless device 2100 that includes processing modules or units, such as a processing unit 2102 and a transmission/reception unit 2104. The processing units may be at least partially implemented via processing circuitry, including virtualized processing circuitry based on underlying circuitry. The wireless device 2100 operates, for example, according to any of the example embodiments described above for a wireless device 12.

Figure 22:
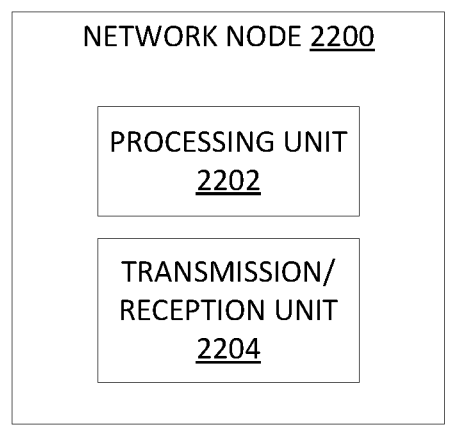
FIG. 22 is a block diagram of one embodiment of a virtualized base station or other radio network node of a wireless communication network.

FIG. 22 depicts a network node 2200 that includes processing modules or units, such as a processing unit 2202 and a transmission/reception unit 2204. The processing units may be at least partially implemented via processing circuitry, including virtualized processing circuitry based on underlying circuitry. The network node 2200 operates, for example, according to any of the example embodiments described above for a radio network node 22.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Thus, modifications and other embodiments of the disclosed invention(s) will come to mind to one skilled in the art having the benefit of the teachings presented in the foregoing descriptions and the associated drawings. Therefore, it is to be understood that the contemplated methods and apparatuses is/are not limited to the specific embodiments disclosed and that modifications and other embodiments are intended to be included within the scope of this disclosure. Although specific terms may be employed herein, they are used in a generic and descriptive sense only and not for purposes of limitation.

The following are further examples to support the understanding of the disclosed embodiments.

A1. A method performed by a wireless device, the method controlling signal measurements by the wireless device in dependence on the type of TA validation method the wireless device is configured to use, wherein the wireless device uses the signal measurements to validate a stored TA value, and wherein, subject to validation, the wireless device performs an uplink transmission on preconfigured uplink resources (PUR) using the stored TA value.

A2. The method of example A1, wherein controlling the signal measurements comprises selecting or adapting a measurement mode, and wherein the signal measurement comprises measurements of one or more reference signals transmitted by one or more radio network nodes of a wireless communication network.

A3. A method performed by a wireless device, the method comprising: responsive to the UE being in a normal measurement mode with respect to performing signal measurements used to assess validity of a stored TA value in the UE, using one or more signal measurements made in the normal measurement mode to assess the validity of the stored TA value and, responsive to the stored TA value being valid, performing an uplink transmission on preconfigured uplink resources (PUR) using the stored TA value; and responsive to the UE being in a relaxed measurement mode with respect to performing the signal measurements used to assess the validity of the stored TA value, not performing the uplink transmission on the PUR using the stored TA value.

A4. A method performed by a wireless device, the method comprising controlling a measurement mode or configuration of the wireless device, in dependence on the particular type of validation method the wireless device is configured to use for validating a stored TA value, to be used by the wireless device for performing an uplink transmission on preconfigured uplink resources (PUR).

A5. The method of example A4, wherein controlling the measurement mode or configuration of the wireless device comprises selecting or remaining in a normal measurement mode, in response to determining that the particular type of validation method is a serving-cell signal evaluation, wherein the wireless device detects or assesses changes between a prior measurement of a serving-cell reference signal and a current measurement of the serving-cell reference signal, as the basis for determining whether the stored TA value is still valid.

A6. A method performed by a wireless device, the method comprising controlling the performance of signal measurements by the wireless device in dependence on whether the signal measurements are to be used by the wireless device in assessing the validity of a stored Timing Advance (TA) value, the signal measurements being reference-signal measurements made by the wireless device on one or more reference signals.

A7. A method performed by a wireless device, the method comprising: receiving a timing advance value from a radio network node in a wireless communication network, for use in adjusting an uplink transmission timing of the wireless device with respect to the radio network node; and subsequently determining whether the Timing Advance (TA) value remains valid for use when performing an uplink transmission on preconfigured uplink resources (PUR); and wherein the wireless device is configured to perform measurements on a reference signal transmitted by the radio network node for purposes of Radio Resource Management (RRM) by the network, and wherein the method includes the wireless device controlling its performance of the measurements in dependence on whether its determination of the validity of the TA value relies on the measurements.

A8. The method of example A7, wherein controlling its performance of the measurements comprises disallowing use of a relaxed measurement mode, responsive to determining that the validity of the TA value is to be determined in dependence on the measurements, wherein the relaxed measurement mode involves less frequent or less accurate measurements, as compared to a normal measurement mode.

A9. The method of example A7 or A8, wherein the wireless device receives the TA value while in a connected state with respect to the network and determines the validity of the TA value while in an idle state with respect to the network.

AA1. The method of any of the previous A examples, further comprising: providing user data; and forwarding the user data to a host computer via the transmission to a radio network node.

B1. A method performed by a network node, the method comprising: determining a measurement configuration of a UE; determining a Timing Advance (TA) validation method, in dependence on the measurement configuration; and indicating the TA validation method to the UE, for use by the UE in subsequently validating a TA value configured in the UE by a radio network node (RNN), for use in controlling an uplink timing of the UE when performing a transmission on preconfigured uplink resources allocated by the RNN.

B2. The method of example B1, wherein determining the TA validation method includes determining whether the measurement configuration of the UE is associated with signal measurements of sufficient reliability for use in the UE validating the configured TA value, the signal measurements being measurements of a reference signal transmitted by the RNN, and, if so, allowing the selection of a TA validation method that depends on the signal measurements, and, if not, disallowing the selection of any TA validation method that depends on the signal measurements.

BB. The method of any of the previous B examples, further comprising: obtaining user data; and forwarding the user data to a host computer or a wireless device.

C1. A wireless device configured to perform any of the steps of any of the A examples.

C2. A wireless device comprising processing circuitry configured to perform any of the steps of any of the A examples.

C3. A wireless device comprising: communication circuitry; and processing circuitry configured to perform any of the steps of any of the A examples.

C4. A wireless device comprising: processing circuitry configured to perform any of the steps of any of the A examples; and power supply circuitry configured to supply power to the wireless device.

C5. A wireless device comprising: processing circuitry and memory, the memory containing instructions executable by the processing circuitry whereby the wireless device is configured to perform any of the steps of any of the A examples.

C6. A user equipment (UE) comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the A examples; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

C7. A computer program comprising instructions which, when executed by at least one processor of a wireless device, causes the wireless device to carry out the steps of any of the A examples.

C8. A carrier containing the computer program of example C7, wherein the carrier is one of an electronic signal, optical signal, radio signal, or computer readable storage medium.

C9. A radio network node configured to perform any of the steps of any of the B examples.

C10. A radio network node comprising processing circuitry configured to perform any of the steps of any of the B examples.

C11. A radio network node comprising: communication circuitry; and processing circuitry configured to perform any of the steps of any of the B examples.

C12. A radio network node comprising: processing circuitry configured to perform any of the steps of any of the B examples; power supply circuitry configured to supply power to the radio network node.

C13. A radio network node comprising: processing circuitry and memory, the memory containing instructions executable by the processing circuitry whereby the radio network node is configured to perform any of the steps of any of the B examples.

C14. The radio network node of any of examples C9-C13, wherein the radio network node is a base station.

C15. A computer program comprising instructions which, when executed by at least one processor of a radio network node, causes the radio network node to carry out the steps of any of the B examples.

C16. The computer program of example C14, wherein the radio network node is a base station.

C17. A carrier containing the computer program of any of examples C15-C16, wherein the carrier is one of an electronic signal, optical signal, radio signal, or computer readable storage medium.

D1. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the B examples.

D2. The communication system of the previous example further including the base station.

D3. The communication system of the previous 2 examples, further including the UE, wherein the UE is configured to communicate with the base station.

D4. The communication system of the previous 3 examples, wherein: the processing circuitry of the host computer is configured to execute a host application, thereby providing the user data; and the UE comprises processing circuitry configured to execute a client application associated with the host application.

D5. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the B examples.

D6. The method of the previous example, further comprising, at the base station, transmitting the user data.

D7. The method of the previous 2 examples, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 examples.

D9. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the A examples.

D10. The communication system of the previous example, wherein the cellular network further includes a base station configured to communicate with the UE.

D11. The communication system of the previous 2 examples, wherein: the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the A examples.

D13. The method of the previous example, further comprising at the UE, receiving the user data from the base station.

D14. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the A examples.

D15. The communication system of the previous example, further including the UE.

D16. The communication system of the previous 2 examples, further including the base station, wherein the base station comprises a radio interface configured to communicate with the UE and a communication interface configured to forward to the host computer the user data carried by a transmission from the UE to the base station.

D17. The communication system of the previous 3 examples, wherein: the processing circuitry of the host computer is configured to execute a host application; and the UE's processing circuitry is configured to execute a client application associated with the host application, thereby providing the user data.

D18. The communication system of the previous 4 examples, wherein: the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising: at the host computer, receiving user data transmitted to the base station from the UE, wherein the UE performs any of the steps of any of the A examples.

D20. The method of the previous example, further comprising, at the UE, providing the user data to the base station.

D21. The method of the previous 2 examples, further comprising: at the UE, executing a client application, thereby providing the user data to be transmitted; and at the host computer, executing a host application associated with the client application.

D22. The method of the previous 3 examples, further comprising: at the UE, executing a client application; and at the UE, receiving input data to the client application, the input data being provided at the host computer by executing a host application associated with the client application, wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the B examples.

D24. The communication system of the previous example further including the base station.

D25. The communication system of the previous 2 examples, further including the UE, wherein the UE is configured to communicate with the base station.

D26. The communication system of the previous 3 examples, wherein: the processing circuitry of the host computer is configured to execute a host application; the UE is configured to execute a client application associated with the host application, thereby providing the user data to be received by the host computer.

D27. A method implemented in a communication system including a host computer, a base station and a user equipment (UE), the method comprising: at the host computer, receiving, from the base station, user data originating from a transmission which the base station has received from the UE, wherein the UE performs any of the steps of any of the A examples.

D28. The method of the previous example, further comprising at the base station, receiving the user data from the UE.

D29. The method of the previous 2 examples, further comprising at the base station, initiating a transmission of the received user data to the host computer.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method performed by a wireless device in a wireless communication network, the method comprising:
    determining a limit on a relaxation factor in response to determining that a configured Timing Advance (TA) validation method of the wireless device depends on successive radio-signal measurements made by the wireless device, the relaxation factor controlling an interval between the successive radio-signal measurements; and
    performing an uplink transmission on preconfigured uplink resources (PUR) of the wireless communication network, in dependence on the configured TA validation method indicating that a configured TA value of the wireless device remains valid, the configured TA value used by the wireless device to control a timing of the uplink transmission.

2. The method of claim 1, wherein the relaxation factor is an integer multiple of a Discontinuous Reception (DRX) cycle configured for the wireless device.

3. The method of claim 2, wherein determining the limit on the relaxation factor comprises restricting a maximum allowed value of the relaxation factor as a function of the length of the DRX cycle.

4. The method of claim 1, wherein determining the limit comprises
    receiving an indication of the limit via control signaling transmitted by a radio network node of the wireless communication network.

5. The method of claim 1, wherein the successive radio-signal measurements comprise received-signal power measurements made by the wireless device, on a reference signal transmitted for a cell of the wireless communication network that is a serving cell for the wireless device.

6. The method of claim 1, wherein the successive radio-signal measurements are Radio Resource Measurements (RRM) as configured by the wireless communication network.

7. The method of claim 1, further comprising the wireless device receiving the configured TA value while the wireless device operates in a connected mode or an idle mode with respect to the wireless communication network.

8. The method of claim 1, wherein the successive radio-signal measurements comprise a current Reference Signal Received Power (RSRP) measurement made by the wireless device with respect to a serving cell of the wireless communication network and a prior RSRP measurement made by the wireless device with respect to the serving cell at a time when the configured TA value was valid, and wherein the configured TA validation method compares the current and prior RSRP measurements to determine whether the configured TA value is valid.

9. A wireless device comprising:
communication circuitry configured to transmit signals to and receive signals from a wireless communication network; and
processing circuitry operatively associated with the communication circuitry and configured to:
determine a limit on a relaxation factor in response to determining that a configured Timing Advance (TA) validation method of the wireless device depends on successive radio-signal measurements made by the wireless device, the relaxation factor controlling an interval between the successive radio-signal measurements; and
perform an uplink transmission on preconfigured uplink resources (PUR) of the wireless communication network, in dependence on the configured TA validation method indicating that a configured TA value of the wireless device remains valid, the configured TA value used by the wireless device to control a timing of the uplink transmission.

10. The wireless device of claim 9, wherein the relaxation factor is an integer multiple of a Discontinuous Reception (DRX) cycle configured for the wireless device.

11. The wireless device of claim 10, wherein the processing circuitry is configured to determine the limit on the relaxation factor as a function of the length of the DRX cycle.

12. The wireless device of claim 9, wherein the processing circuitry is configured to determine the limit by receiving an indication of the limit via control signaling transmitted by a radio network node of the wireless communication network.

13. The wireless device of claim 9, wherein the successive radio-signal measurements comprise received-signal power measurements made by the wireless device on a reference signal transmitted for a cell of the wireless communication network that is a serving cell for the wireless device.

14. The wireless device of claim 9, wherein the successive radio-signal measurements are Radio Resource Measurements (RRM) as configured by the wireless communication network.

15. The wireless device of claim 9, wherein the processing circuitry is configured to receive the configured TA value while the wireless device operates in a connected mode or an idle mode with respect to the wireless communication network.

16. The wireless device of claim 9, wherein the successive radio-signal measurements comprise a current Reference Signal Received Power (RSRP) measurement made by the wireless device with respect to a serving cell of the wireless communication network and a prior RSRP measurement made by the wireless device with respect to the serving cell at a time when the configured TA value was valid, and wherein the configured TA validation method compares the current and prior RSRP measurements to determine whether the configured TA value is valid.

17. A method performed by a radio network node in a wireless communication network, the method comprising:
determining a limit on a relaxation factor in response to determining that a configured Timing Advance (TA) validation method of the wireless device depends on successive radio-signal measurements that are made by the wireless device, the relaxation factor controlling an interval between the successive-radio signal measurements and the configured TA validation method used by the wireless device for validating a TA value as a condition for performing an uplink transmission on preconfigured uplink resources (PUR) of the wireless communication network; and
transmitting an indication of the limit for the wireless device.

18. The method of claim 17, wherein transmitting the indication of the limit comprises transmitting the indication via dedicated signaling or broadcasted signaling, in a cell of the wireless communication network that is a serving cell with respect to the wireless device.

19. The method of claim 17, wherein the relaxation factor serves as an integer multiple of a length of a Discontinuous Reception (DRX) cycle associated with operation of the wireless device, and wherein the method includes determining the limit as a function of the length of the DRX cycle.

20. A radio network node comprising:
communication circuitry configured to transmit signals to and receive signals from a wireless communication device; and
processing circuitry operatively associated with the communication circuitry and configured to:
determine a limit on a relaxation factor in response to determining that a configured Timing Advance (TA) validation method of the wireless device depends on successive radio-signal measurements that are made by the wireless device, the relaxation factor controlling an interval between the successive-radio signal measurements and the configured TA validation method used by the wireless device for validating a TA value as a condition for performing an uplink transmission on preconfigured uplink resources (PUR) of the wireless communication network; and
transmit an indication of the limit for the wireless device.

21. The radio network node of claim 20, wherein the processing circuitry is configured to transmit the indication of the limit via dedicated signaling or broadcasted signaling in a cell of the wireless communication network that is a serving cell with respect to the wireless device.

22. The radio network node of claim 20, wherein the relaxation factor that serves as an integer multiple of a length of a Discontinuous Reception (DRX) cycle associated with operation of the wireless device, and wherein the processing circuitry is configured to determine the limit as a function of the length of the DRX cycle.

* * * * *